United States Patent [19]

Ishikawa et al.

[11] Patent Number: 5,594,415
[45] Date of Patent: Jan. 14, 1997

[54] DISPLAY DEVICE FOR A VEHICLE

[75] Inventors: Masaaki Ishikawa; Masao Yamada, both of Tokyo, Japan

[73] Assignee: Tamapack Co., Ltd., Tokyo, Japan

[21] Appl. No.: 409,523

[22] Filed: Mar. 24, 1995

Related U.S. Application Data

[63] Continuation of Ser. No. 22,886, Feb. 16, 1993, Pat. No. 5,463,370, which is a continuation of Ser. No. 490,551, filed as PCT/JP89/00719 published Jul. 18, 1989, abandoned.

[30] Foreign Application Priority Data

| Jul. 18, 1988 | [JP] | Japan | 63-178332 |
|---|---|---|---|
| Aug. 11, 1988 | [JP] | Japan | 63-200417 |
| Aug. 11, 1988 | [JP] | Japan | 63-200418 |
| Oct. 21, 1988 | [JP] | Japan | 63-265774 |
| Oct. 28, 1988 | [JP] | Japan | 63-140870 U |
| Jan. 19, 1989 | [JP] | Japan | 1-10433 |
| Mar. 2, 1989 | [JP] | Japan | 1-23981 U |
| Mar. 6, 1989 | [JP] | Japan | 1-53568 |
| Apr. 18, 1989 | [JP] | Japan | 1-98565 |

[51] Int. Cl.$^6$ .................................................. B60Q 1/00
[52] U.S. Cl. .......................... 340/467; 340/463; 340/464; 340/465; 340/466; 340/468; 340/478
[58] Field of Search ........................ 340/439, 441, 340/463, 466–469, 478, 479, 459, 465, 464, 488, 489, 461, 975, 984; 200/61.89, 61.29; 273/442, 351, 371, 378, 379, 86 R, 433, 434, 438; 434/62, 65, 45, 47, 69, 30

[56] References Cited

U.S. PATENT DOCUMENTS

| 2,179,889 | 11/1939 | Hall | 340/478 |
|---|---|---|---|
| 2,201,795 | 5/1940 | Schnurpfeil | 340/465 |
| 3,320,586 | 5/1967 | Wagner | 340/464 |
| 3,550,076 | 12/1970 | Kent | 340/466 |
| 3,676,844 | 7/1972 | Hendrickson | 340/467 |
| 3,683,329 | 8/1972 | Sattler | 340/479 |
| 3,691,525 | 9/1972 | McClellan, Sr. et al. | 340/466 |
| 3,787,808 | 1/1974 | Knopf | 340/464 |
| 3,827,024 | 7/1974 | Anderson et al. | 340/463 |
| 4,059,824 | 11/1977 | Tanimura | 340/467 |
| 4,149,141 | 4/1979 | Tanimura | |
| 4,357,594 | 11/1982 | Ehrlich et al. | 340/467 |
| 4,420,741 | 12/1983 | West | 340/984 |
| 4,556,862 | 12/1985 | Meinershagen | 340/466 |

(List continued on next page.)

FOREIGN PATENT DOCUMENTS

| 0019502 | 4/1970 | European Pat. Off. . |
|---|---|---|
| 1477800 | 4/1967 | France . |
| 1945867 | 11/1980 | Germany . |
| 58-124954 | 7/1983 | Japan . |
| 58-128939 | 8/1983 | Japan . |
| 61-175138 | 8/1986 | Japan . |
| 63-74742 | 4/1988 | Japan . |

Primary Examiner—Donnie L. Crosland
Attorney, Agent, or Firm—Greenblum & Bernstein P.L.C.

[57] ABSTRACT

A sensor for detecting the degree of the operation of the accelerator in an automobile is provided and the display apparatus for expanding shrinking the display detection of the sensor is provided in the automobile so that the display apparatus can be observed from the outside. A apparatus for detecting the number of rotation of engine and the depressing degree of the brake pedal also provided. The number of the engine and the depressing degree of the brake pedal as well as operation degree of the accelerator pedal is displayed inside the car and outside the car by using the light emitting display apparatus. Apparatus for detecting the running speed of vehicle and the apparatus for detecting the acceleration and the deceleration of the vehicle are provided a plurality of different meaningful of character strings are displayed outside the vehicle in accordance with the detection status of the detecting apparatus to that the running status of the automobile is displayed. Based on the detecting apparatus for detecting the rotation direction of the clockwise direction or the anti-clockwise direction of the handle and the degree of the rotation is also detected by the detectors which can be observed from outside of the car and the moving running direction of the vehicle can be displayed.

9 Claims, 39 Drawing Sheets

U.S. PATENT DOCUMENTS

| | | | |
|---|---|---|---|
| 4,638,295 | 1/1987 | Middlebrook et al. | 340/465 |
| 4,651,129 | 3/1987 | Wood et al. | 340/467 |
| 4,652,878 | 3/1987 | Borgersen | 340/984 |
| 4,663,627 | 5/1987 | Dennis | 340/975 |
| 4,682,146 | 7/1987 | Friedman, III | 340/468 |
| 4,868,719 | 9/1989 | Kouchi et al. | 340/479 |
| 4,929,943 | 5/1990 | Baldwin | 340/984 |
| 4,996,657 | 2/1991 | Shiraishi et al. | 340/465 |

ACCELERATOR ON

ACCELERATOR OFF

BRAKE ON

ACCELERATOR ON

ACCELERATOR OFF

BRAKE ON

ACCELERATOR ON

ACCELERATOR OFF

BRAKE ON

ACCELERATOR ON

ACCELERATOR OFF

BRAKE ON

ACCELERATOR ON   Fig. 11(a)
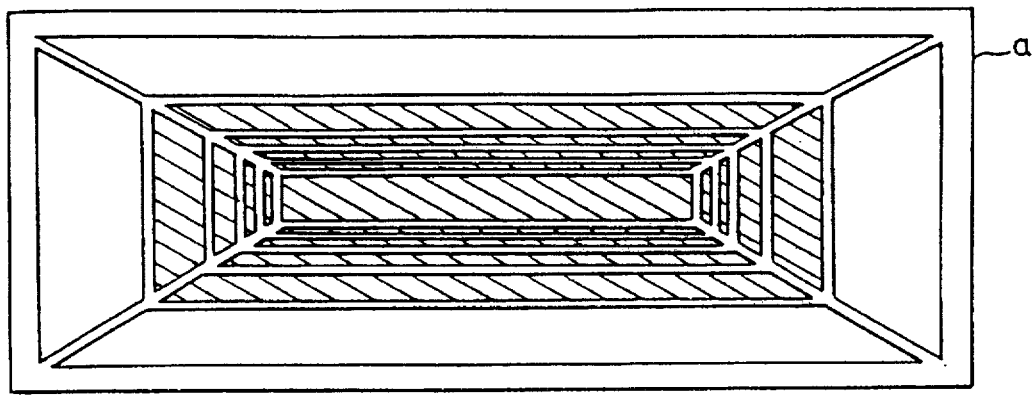
ACCELERATOR OFF   Fig. 11(b)
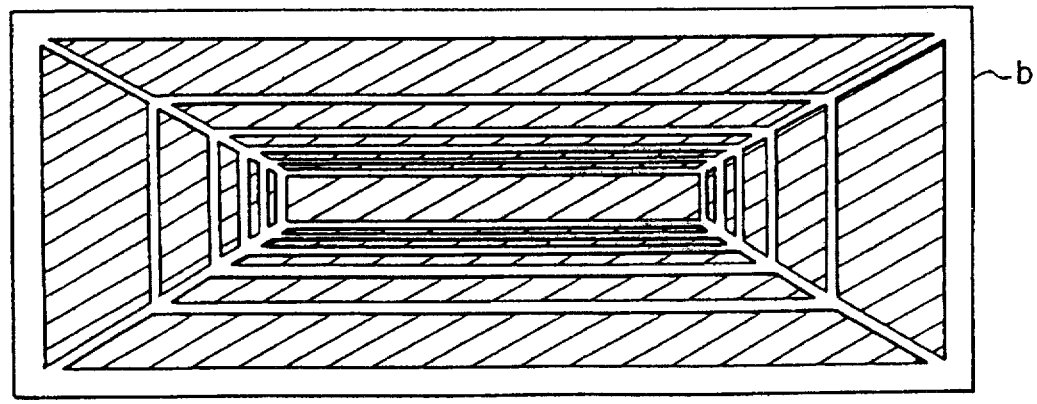
BRAKE ON   Fig. 11(c)
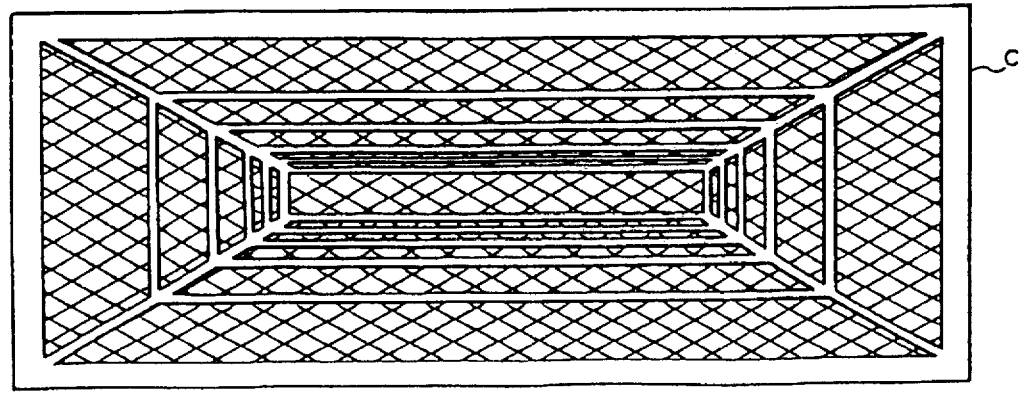

ACCELERATOR ON

ACCELERATOR OFF

BRAKE ON

ACCELERATOR ON

ACCELERATOR OFF

BRAKE ON

FIG. 14
Fig. 14(a)
ACCELERATOR ON
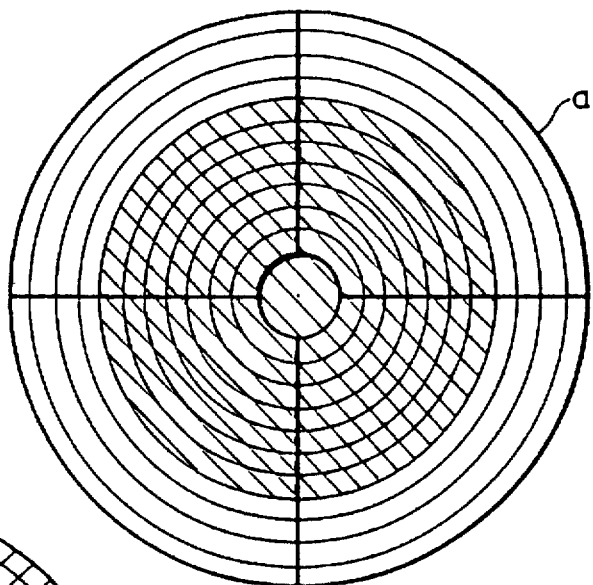
Fig. 14(b)
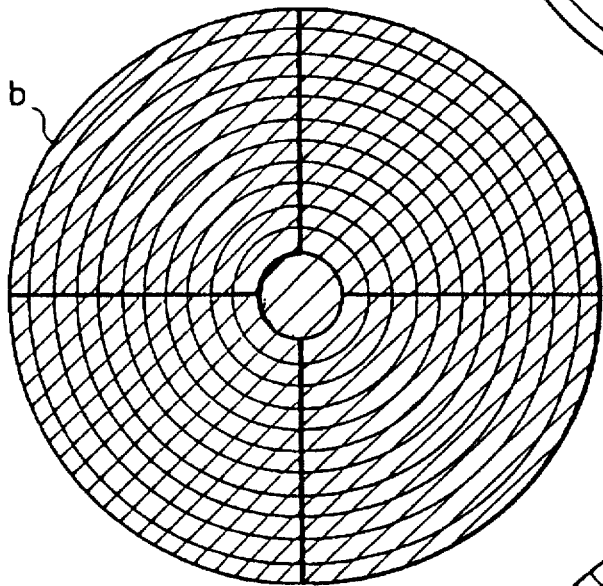
ACCELERATOR OFF
Fig. 14(c)
BRAKE ON
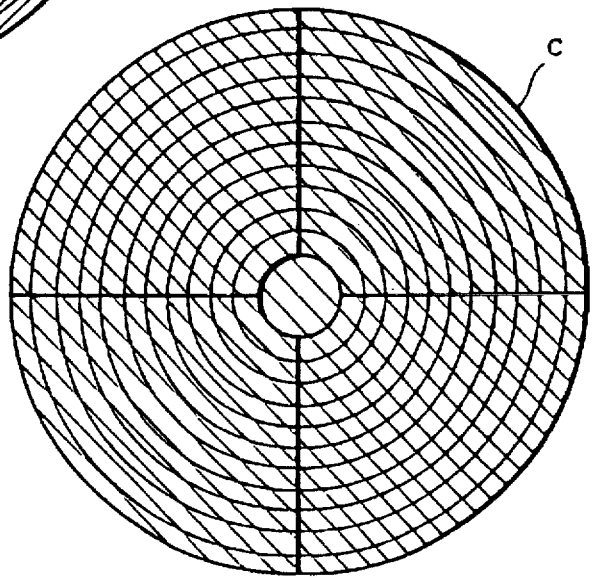

ACCELERATOR
CLOSE → OPEN

ACCELERATOR
OPEN → CLOSE

ACCELERATOR OFF

ACCELERATOR ON  *Fig. 16(a)*
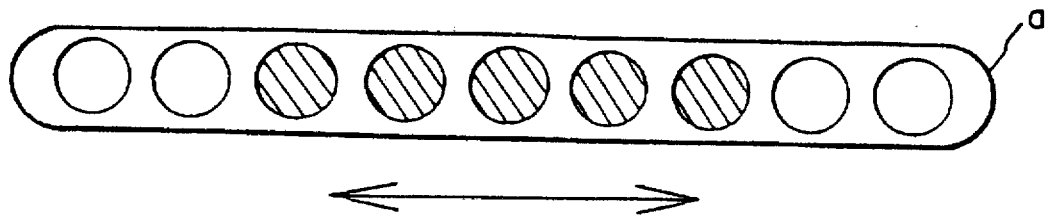
ACCELERATOR OFF  *Fig. 16(b)*
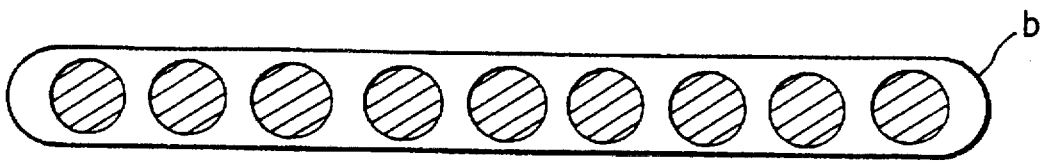
BRAKE ON  *Fig. 16(c)*
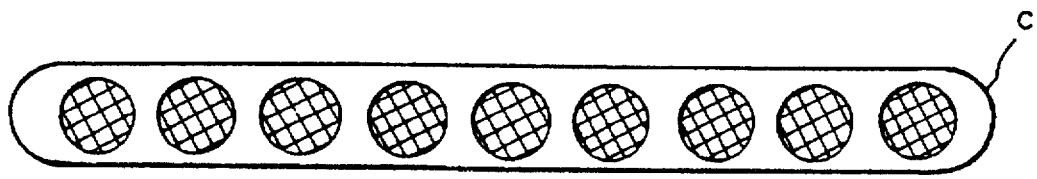
WINKER ON  *Fig. 16(d)*
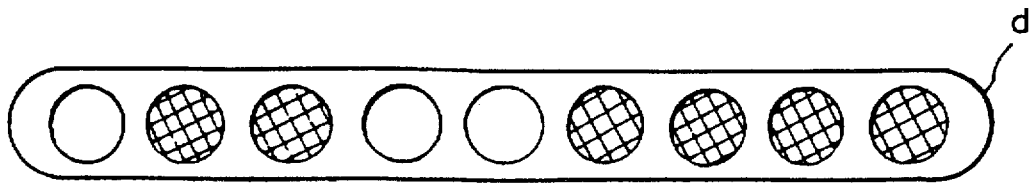
⟵ LIGHT FLOWING ACCELERATOR ON  Fig. 17(a)
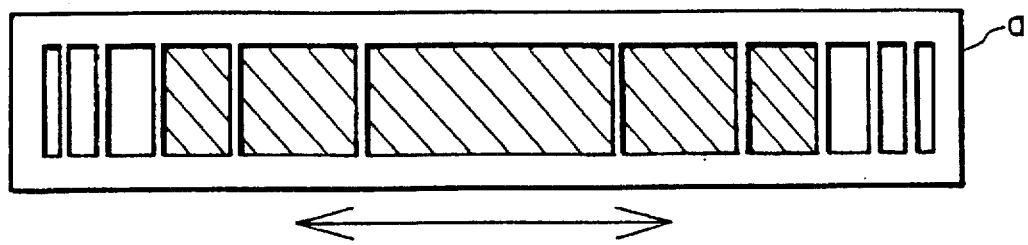
ACCELERATOR OFF  Fig. 17(b)
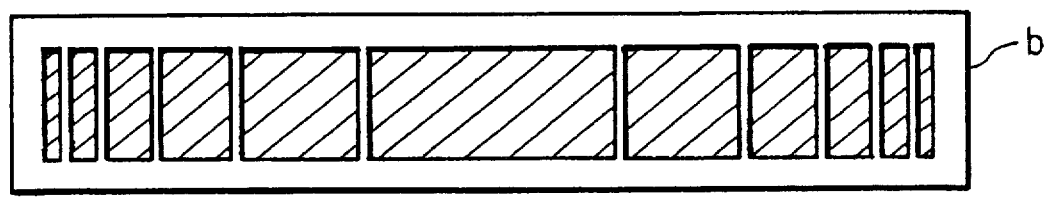
BRAKE ON  Fig. 17(c)
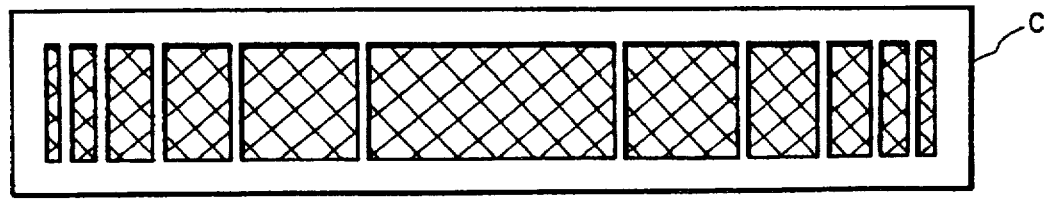
WINKER ON  Fig. 17(d)
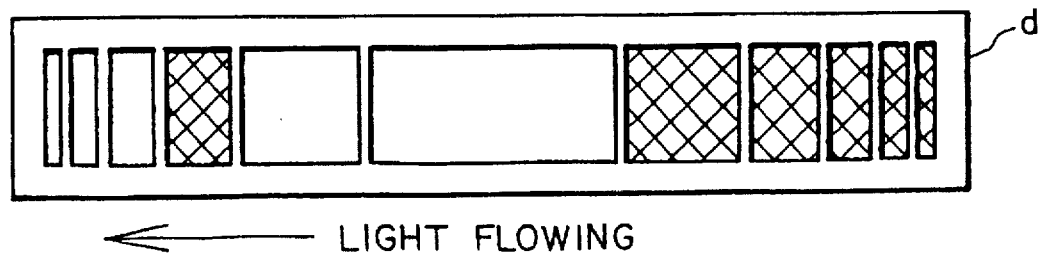
⟵ LIGHT FLOWING

ACCELERATOR ON

ACCELERATOR
CLOSE → OPEN

ACCELERATOR OFF

BRAKE ON

ACCELERATOR ON

ACCELERATOR OPEN→CLOSE

ACCELERATOR OFF

BRAKE ON

ACCELERATOR
ON

ACCELERATOR
CLOSE → OPEN

ACCELERATOR
OFF

BRAKE ON

ACCELERATOR ON

ACCELERATOR
CLOSE → OPEN

ROTATING IS SPEEDING UP
IN ACCORDANCE WITH
THE ACCELERATOR
20 → 21 → 22

ACCELERATOR OFF
ROTATING IS SPEEDING UP
IN ACCORDANCE WITH THE
ACCELERATOR
20 → 21 → 22

BRAKE ON

ACCELERATOR ON

ACCELERATOR
CLOSE → OPEN

LIGHT FLOWING

ACCELERATOR OFF

BRAKE ON
LIGHT FLOWING

ACCELERATOR ON

ACCELERATOR
CLOSE → OPEN        LIGHT FLOWING ⟶

ACCELERATOR OFF

BRAKE ON

ACCELERATOR
ON

LIGHT FLOWING ⟶

ACCELERATOR
CLOSE—OPEN

ACCELERATOR
OFF

LIGHT FLOWING ⟶

BRAKE ON

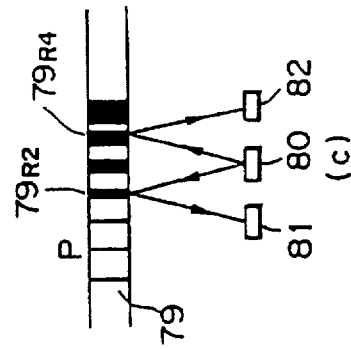
FIG. 36
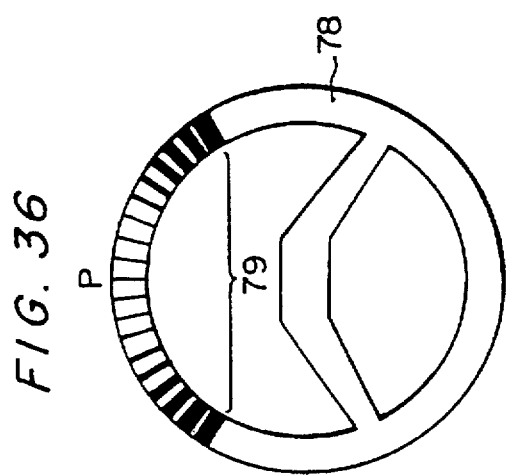
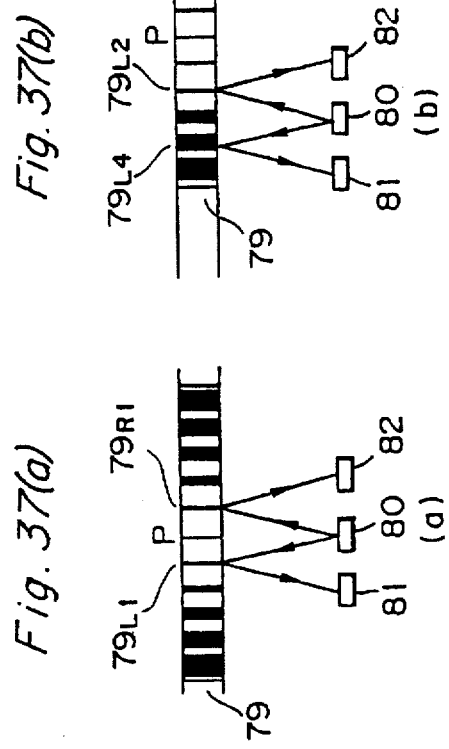
Fig. 37(a)
Fig. 37(b)
Fig. 37(c)

(a)

(b)

5,594,415

DISPLAY DEVICE FOR A VEHICLE

This application is a continuation of application Ser. No. 08/022,886, filed Feb. 16, 1993, now U.S. Pat. No. 5,463,370 which is a continuation of application Ser. No. 07/490,551 filed Mar. 19, 1990 and having a 102(e) date of May 3, 1990, now abandoned, which is the U.S. National Phase of PCT/JP89/00719 filed Jul. 18, 1989.

FIELD OF THE INVENTION

This invention relates to a display devise for providing people with information concerning traffic from displays corresponding to various traffic conditions, thus enhancing safety of vehicles in traffic, and a display body used therefor.

BACKGROUND OF THE INVENTION

This invention relates to a display device for a vehicle and particularly to a display device for preventing vehicle accidents.

A conventional display device provided at the rear an automobile or bike to prevent collisions, is a light which is activated upon braking or handling a brake lever. However, with this display devices if the distance between cars is not sufficient and braking is conducted suddenly, a collision may still occur. Further, if a driver maintain a distance for enough behind the car in front to prevent a collision he is frequently squeezed by the car behind, thus obliging him to shorten his following.

If a car approaches a slope road from a flat road, or a gravel road from an asphalt road, it is often hard to maintain its speed even if the driver operates the accelerator.

In such a case, a driver changes gear to increase the rotations of the engine. Since an operation of the accelerator doesn't necessarily increase speed, a display device which assesses a car's speed from changes of accelerator operation is not practical.

A following driver becomes aware of the turning direction of the car in front when it car turns, although he is previously informed by a winker. Further, a car body moves a little after the turning operation.

When a bus or a taxi is running on a mountain road with many curves or on a bumpy road, the river worries about his driving, "How fast am I going?" or "What shall I do if the car in front brakes suddenly?"

The tale lamp notifies the following car of a braking operation and the winder tells the following car and the oncoming car of a driver's intention to change traffic lanes or to make right or left turn. These display devices show driving conditions or driver intentions to other cars. However, persons inside the car are unable to see the displays. Therefore, they must infer the conditions from the movement of the car.

DISCLOSURE OF THE INVENTION

This invention is designed to overcome the above defects. An object of the present invention is to provide an accelerator operation amount display device which shows the amount of accelerator operation to a following driver, who can thus select a safe following distance.

Another object of the present invention is to provide a display body whose display portion gradually expands in response to the accelerator operation amount.

Another object of the present invention is to provide a display body in which a plurality of divided display portions are made a cyclically and in sequence, so that the display portion appears to be rotating in accordance with the accelerator operation level.

Another object of the invention is to provide a display device which informs a following car of the speed of the car in front.

A further object of the present invention is to provide a vehicle body turning direction display device which enables a following car to see a handle operation of the car in front.

Another object of the present invention is to provide a condition display device for use in a vehicle which allows various displays to be observed by other drivers, such a reflecting the actual motion of a vehicle or showing a stopped condition of a vehicle, in accordance with the situation.

A still further object of the present invention is to provide an interopr display device in a car, with which informs persons inside the car of the driving condition.

A still further object of the present invention is to provide an accelerator operation amount sensor for providing data to the accelerator operation amount display device for preventing decreases in magnetic flux interlinkage of coil caused by excess current to maintain good sensitivity.

The present invention is provided with a sensor for sensing the extent of accelerator operation and a luminous display placed so as to face outside the car. This display is designed to expand according to the extent of accelerator operation. It is also provided with means for sensing the rotations of the engine and the extent of accelerator operation. The rotations of the engine and the extent of brake pedal operation, together with said accelerator operation level, are luminously displayed inside and outside the car.

The present invention is also provided with a speed sensing means and an acceleration-deceleration sensing means. A plurality of significantly different character-strings is displayed outside the car in response to sensing results of the above sensing means.

The present invention is also provided with a sensing means for sensing the turning direction and turning angle, together with an appropriate display means.

BRIEF DESCRIPTION OF THE DRAWINGS

FIG. 36 is a real view of the handle on which the reflector body is provided in the vehicle moving direction display apparatus, FIGS. 37(a), (b) and (c) are drawings for explaining the means for detecting degree of rotation in the vehicle moving direction display apparatus.

THE BEST MODE FOR PRACTICING THE PRESENT INVENTION

Figure 1:
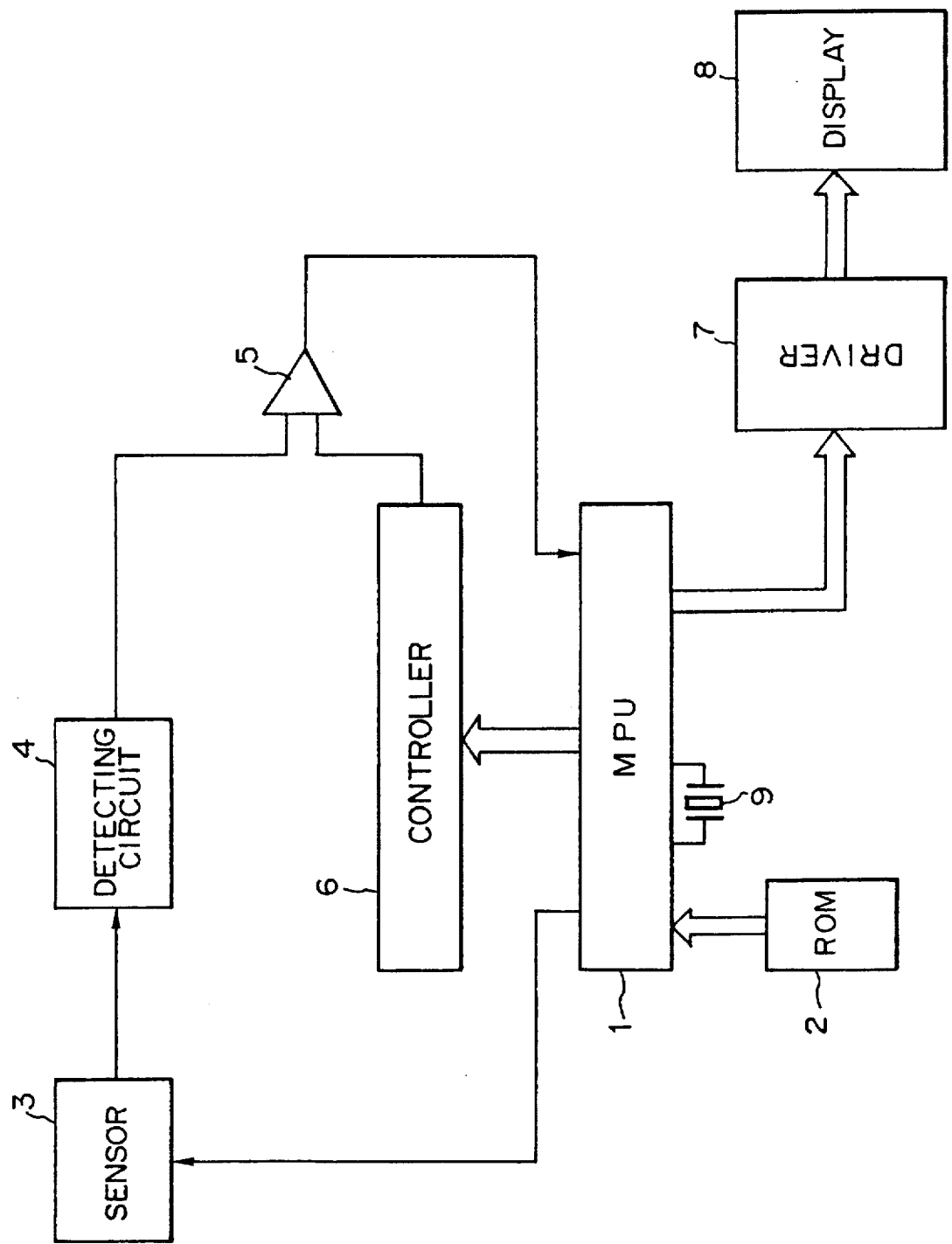
FIG. 1 is a block diagram showing the structure of the accelerator operation amount display device.

FIG. 1 shows a block diagram of a display apparatus for displaying the amount of an accelerator operation according to the present invention. A micro-processor (called MPU hereinafter) 1 comprises a so-called one-chip micro-processor installed with a CPU, a RAM, a parallel input and output port, a timer, and a clock oscillator. The operation program of the MPU is written in ROM 2, which is connected to MPU 1 through the data bus for MPU 1.

A driver pulse is supplied to sensor 3 for detecting the amount of accelerator operation and the drive pulse is applied from the output port 1 bit of the MPU. The detection output of the sensor 3 is supplied to comparator 5 through a rectification or a current smoothing detecting circuit 4. The output of comparator 5 is added to a one-bit of MPU 1.

On the other hand, the output port of MPU 1 (for example, 9 bits) is connected to controller 6 and the output of controller 6 is applied to comparator 5 as a reference voltage.

Figure 3:
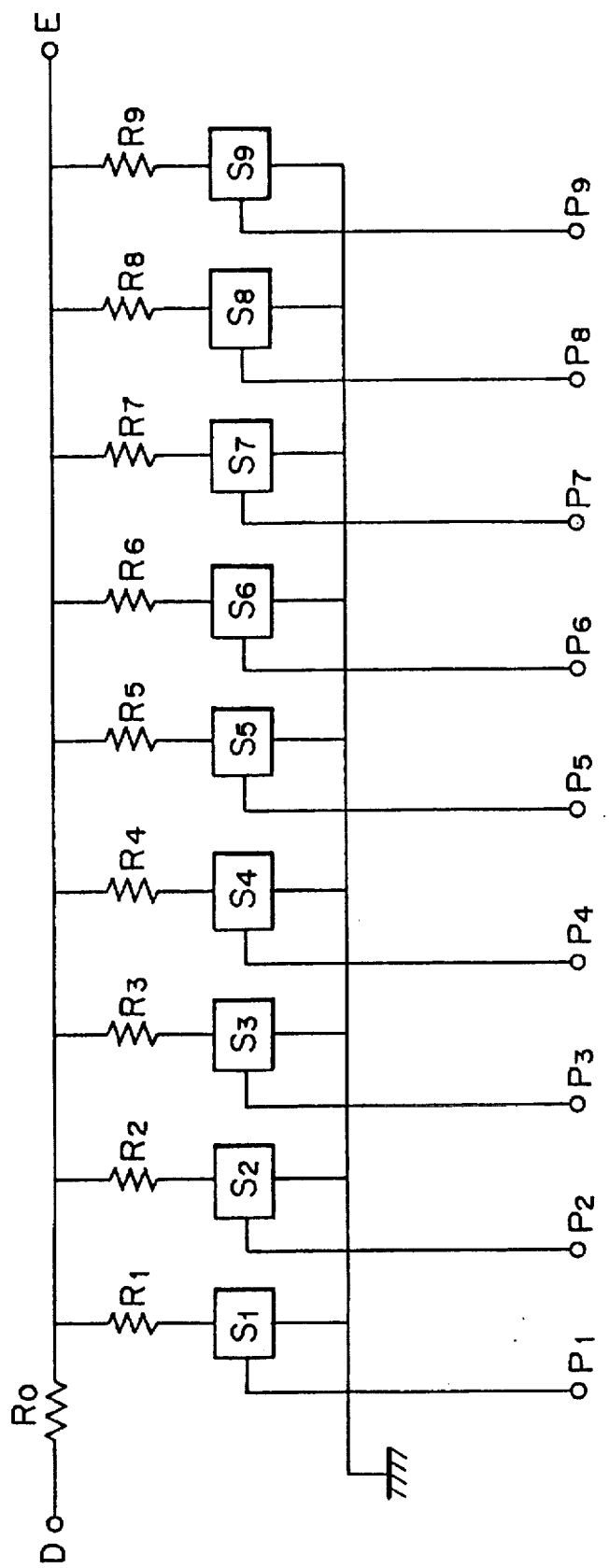
FIG. 3 is a circuit diagram of a controller.

The controller 6 has a plurality of registors and switching elements, as shown in FIG. 3, and the switching element is selected by the MPU 1, thereby varying the reference voltage of the comparator 5.

The other output of MPU 1 is supplied to driver 7 and the output of driver 7 is applied to display 8. A clock oscillator is provided to crystal oscillator 9.

Figure 2:
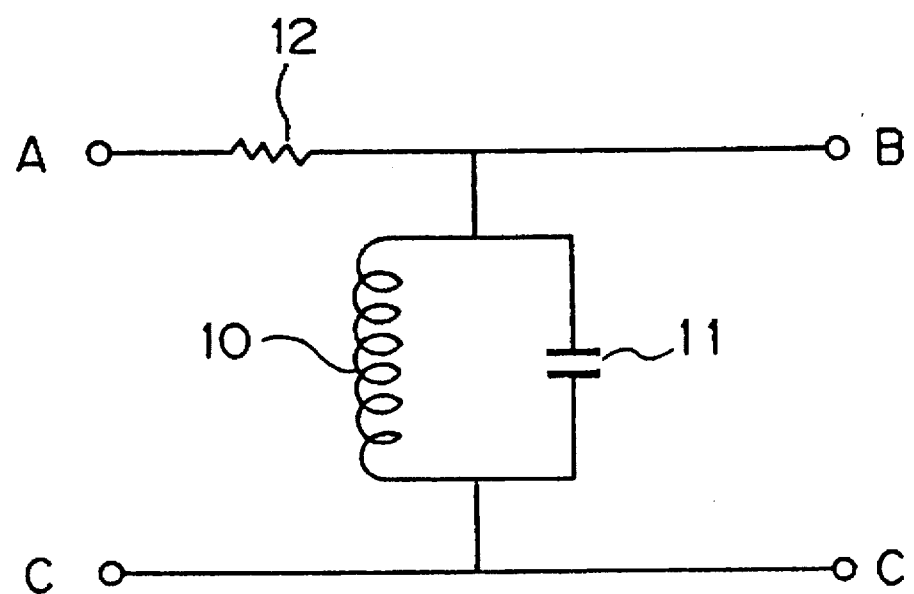
FIG. 2 is a circuit diagram of a sensor.

FIG. 2 shows a circuit diagram of sensor 3. As shown, sensor 3 comprises a parallel oscillating circuit comprising coil 10 and condenser 11. Terminal B is connected to detection circuit 4 and the output of the output port of 1 bit of MPU 1 is supplied to the parallel oscillation circuit through registor 12. Terminal C is maintained at ground potential.

Coil 9 is formed of that circle henpei having a diameter of about 10 cm. A 0.6-mm-wire is turned 30 times and provided with a condenser 11 and a registor 12. Coil 9, condenser 11 and registor 12 are enclosed in a suitable protector and fixed to the floor and to the accelerator pedal. They are formed by using a lead line, as shown in FIG. 1. A rectangular 5k Hz wave is formed by a program using MPU 1. This wave is applied to the parallel oscillator circuit from the output port of one bit of MPU 1.

FIG. 3 shows a circuit diagram of the controller 6. Registor R0 is grounded (connected to the minus terminal of the power source) through registors R1 to R9, switching element S1 to S9 such as transistor, PET. Respective control terminals of the switching elements are connected to output ports P1 to P9 and to MPU 1. Once of the registors R1 to R9 is selected by making one of the output ports P1 to P9 at "H" level. The output voltage, which is divided between registor R0 and one of registors R1 to R9 is provided to terminal E. A stable voltage is supplied between terminal D and ground through a zener diode. The voltage produced at terminal E is supplied to comparator 5 in FIG. 1 as the reference voltage.

Figure 4:
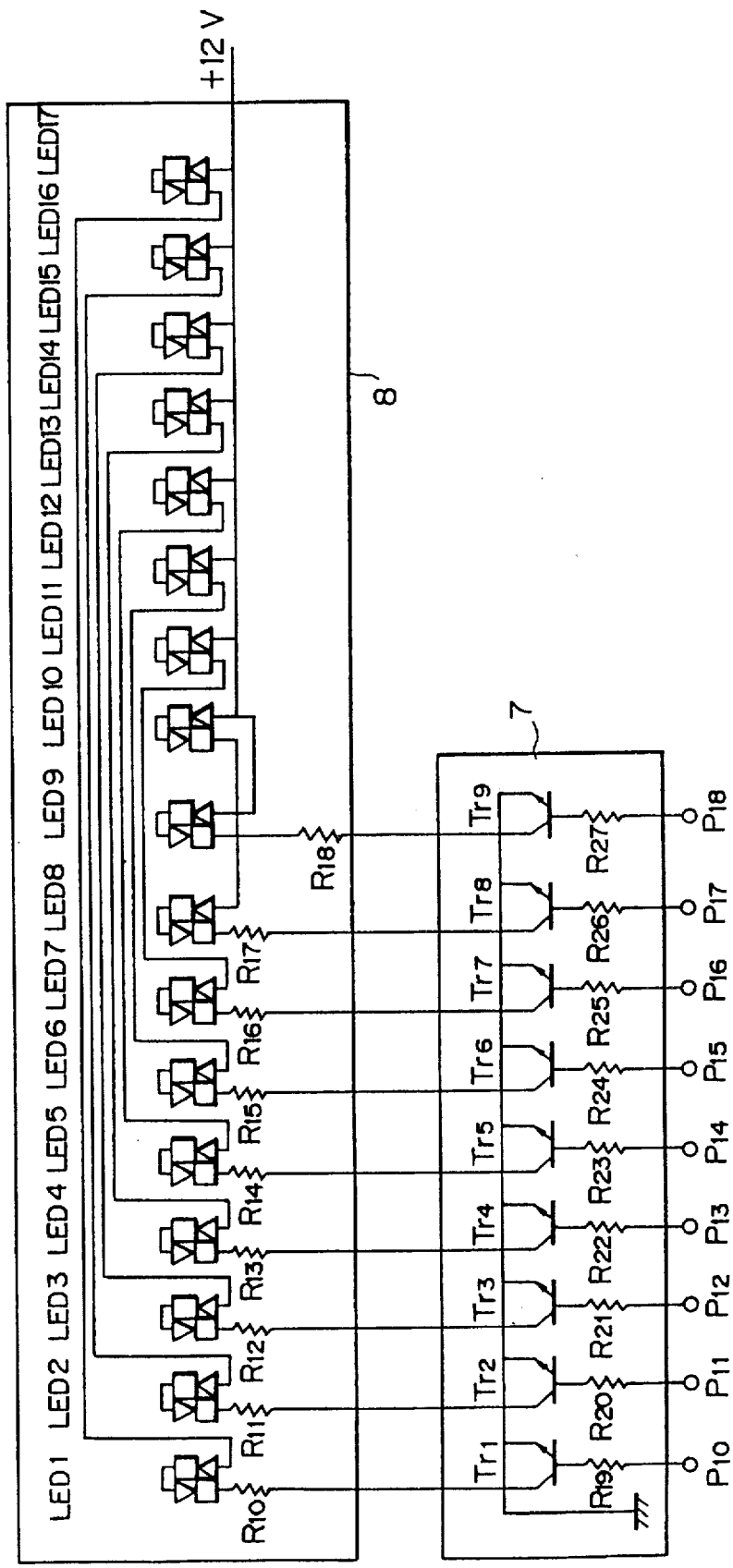
FIG. 4 is a circuit diagram of a driver and the display, FIG. 5(*a*) is a drawing of a model designating an arrangement of a peripheral portion of the accelerator pedal and FIG. 5(*b*) shows when the accelerator operation degree display apparatus is formed by a sensor provided on the magnetic flux path.

FIG. 4 is an example of a circuit diagram of the driver 7 and the display 8. Driver 7 is formed of transistors $Tr_1$ to $Tr_9$. The bases of respective transistors are connected to the other output ports $P_{10}$ to $P_{19}$ of MPU 1 through corresponding registors $R_{19}$ to $R_{27}$. The emitters of respective transistors are commonly grounded. The connector is connected to the terminal of corresponding light emitting elements LED1 to LED8 through corresponding registors $R_{10}$ to $R_{18}$. The other terminal of these light emitting elements LED1 to LED8 are connected to the +terminal of the power source, not shown, through the corresponding light emitting elements LED 10 to LED17. Operation of the display device for the amount of accelerator operation according to the present invention is explained hereinafter.

The driving signal is formed into a rectangular wave of about 5 kHz by an execution of a timer interruption routine and applied to the parallel oscillation circuit. Therefore, the sensor 3 outputs a sine wave signal which becomes the maximum in an oscillation frequency due to a flywheel effect and the sine wave signal is subject to a rectification by a diode, not shown, of detecting circuit 4. The rectification output is smoothed by a filter, not shown, to provide almost direct current and is input to a comparator 5 as a signal to be compared.

MPU 1 operates controller 6 by executing other programs. By referring to FIG. 3, the output port P1 selected from among output ports P1 to P9 is first converted from "L" level to "H" level. Then, switching element S1 become conductive and the terminal voltage of resistor R1 is supplied to comparator 5 as a reference voltage. The output of comparator 5 is supplied to an input port of MPU 1 and MPU1 examines whether or not the state of the input port is changed from "L" to "H" level. If it is not changed, the output port P1 is returned to the original "L" level and the output port P2 is changed from "L" level to "H" level. Thus, MPU 1 examines the state of the input port in the same manner as described above. If the state of the input port is not changed, the output port P2 is returned to "L" level and the output port P3 is changed from "L" level to "H" level, thereby detecting the state of the input port. Such operation is repeated until the output port P9 is reached in turns hereinafter and about 500 msec passes before a cycle of the operation is completed. The operation is conducted so that the reference voltage of comparator 5 is stepped from a high voltage to a low voltage. When the state of the input port and output of comparator 5 are turned to "H" level, it is judged which of output ports P1 to P9 is turned to "H" level. Based on this judgment, it is determined which of the output ports P10 to P18 to be outputted to driver 7 is turned to "H" level, and thus the execution is conducted. The signal to be compared is input to comparator 5. When sensor 3 is fixed under the accelerator pedal, this signal is set to a maximum when the accelerator pedal is not depressed. This is realized by previously determining the frequency of the driving signal of the sensor and the oscillation frequency of the parallel oscillation circuit. The difference between the voltage of the signal to be compared and the maximum voltage is obtained when the accelerator pedal is fully depressed. The difference is divided into 9 steps in the embodiment and resistors R0 to R9 of controller 6 are determined so that 9 steps of the different voltage are applied to the comparator as reference voltages. For example, the maximum voltage is 5V and the voltage of the signal to be compared when said accelerator pedal is fully stepped on is 0.6V, the difference between the maximum voltage and the voltage of the signal to be compared is 4.4V. Accordingly, voltages of 4.4V, 3.91V, 3.42V, 2.93V, 2.44V, 1.96V, 1.47V, 0.98V and 0.49V are sequentially supplied to comparator 5 as reference voltages and the operation of output ports P1 to P9. If the accelerator pedal is fully depressed 9 voltage of 0.6V is applied as the signal to be compared. In this case, where output port P9 is in "H" level, i.e., the reference voltage of comparator 5 is 0.49V, the output of comparator 5 becomes "H" level. Therefore, MPU 1 turns all the output ports P10 to P17 for outputting the signal to driver 7 to "H" level. Accordingly, when the accelerator pedal is fully depressed, all the green LEDs 1 to 17, except for LED9 are turned on. However, if the accelerator pedal is only slightly depressed a voltage of 4.2V is applied as the signal to be compared. In this case, where output port P2 is in "H" level, i.e., the reference voltage of comparator 5 is 3.91V, the output of comparator 5 becomes "H" level. Therefore, MPU 1 turns only the output port P17 for outputting the signal to driver 7 to "H" level. Accordingly, in this case, LED6 and LED10 in FIG. 4 are turned on. When the accelerator pedal is not depressed, output port P18 is turned to "H" level, and, for example, yellow LED is turned on. Output port 18 is turned to "L" level so that LED 9 is turned off when the accelerator pedal is depressed upon lightening other LEDs. This embodiment is formed of an LED but may be formed using a white-heat electric valve as the light emitting element.

The coil 10 of sensor 3 is provided close to the floor of the automobile. As described above, the magnetic flux produced when the drive pulse is applied to the coil 10 is outputted from one terminal of coil 10. It then passes through the floor of the automobile and returns to the other end of the coil 10. The floor of the automobile is formed of an iron plate. Therefore, when the magnetic flux penetrates the iron plate, an AC current is produced. As a result, the magnetic flux around the coil 10 is decreased, thus lowering the sensitivity of the sensor.

The problem can be solved with the following structure.

Figure 5A:
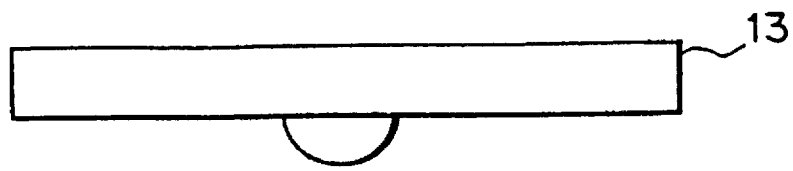
Figure 5B:
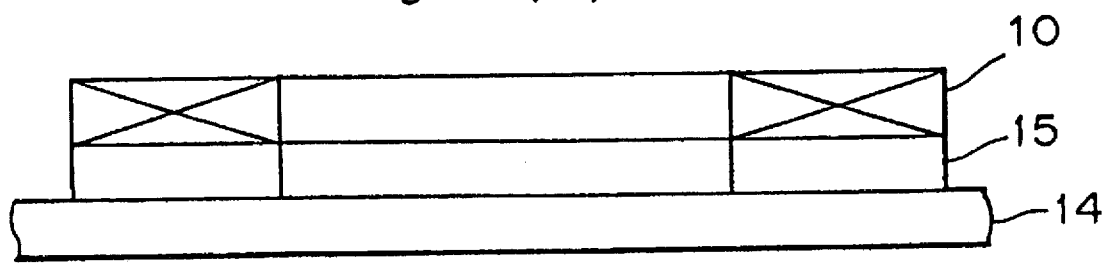

FIG. 5 is a model diagram representing a positional arrangement of a circuit around the periphery of the accelerator pedal relating to the accelerator pedal operating amount displaying apparatus. In FIG. 5(a), accelerator pedal 13 is positioned in the front part of the automobile and magnetic path 15 (FIG. 5(b)) is formed by a silicon plate fixed on the floor 14 under accelerator pedal 13. Coil 10 forming the parallel oscillation circuit is fixed or mounted on the magnetic path.

Figure 6:
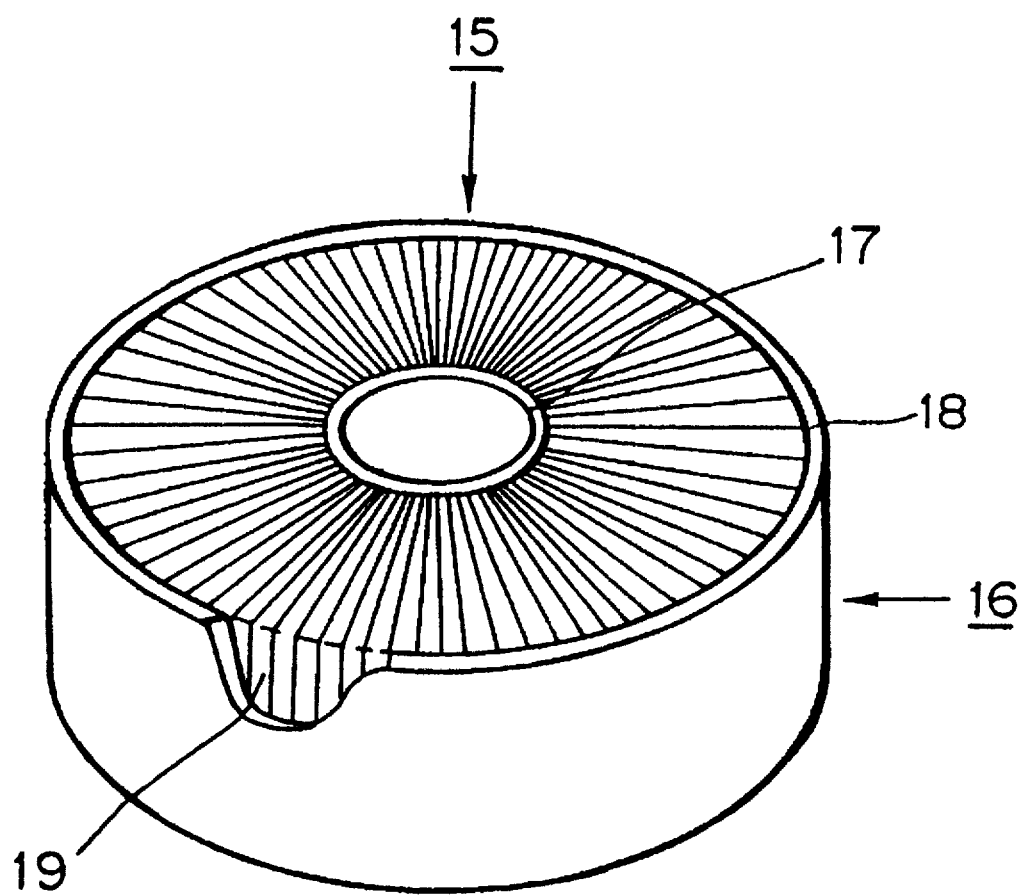
FIG. 6 shows a partially cut perspective view of a magnetic path.
Figure 7A:
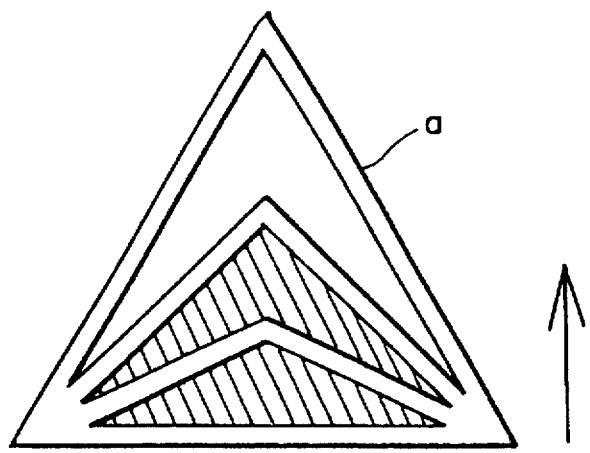
FIGS. 7(*a*), 7(*b*), 7(*c*), 8(*a*), 8(*b*), 8(*c*), 9(*a*), 9(*b*), 9(*c*), 10(*a*), 10(*b*), 10(*c*), 11(*a*), 11(*b*), 11(*c*), 12(*a*), 12(*b*), 12(*c*), 13(*a*), 13(*b*), 13(*c*), 14(*a*), 14(*b*), 14(*c*), 15(*a*), 15(*b*), 15(*c*), 16(*a*), 16(*b*), 16(*c*), 16(*d*), 17(*a*), 17(*b*), 17(*c*), 17(*d*), 18(*a*), 18(*b*), 18(*c*), 18(*d*), 19(*a*), 19(*b*), 19(*c*), 19(*d*), 20(*a*), 20(*b*), 20(*c*) and 20(*d*), are plan views of main part of the display body and for the accelerator operation degree display apparatus.
Figure 7B:
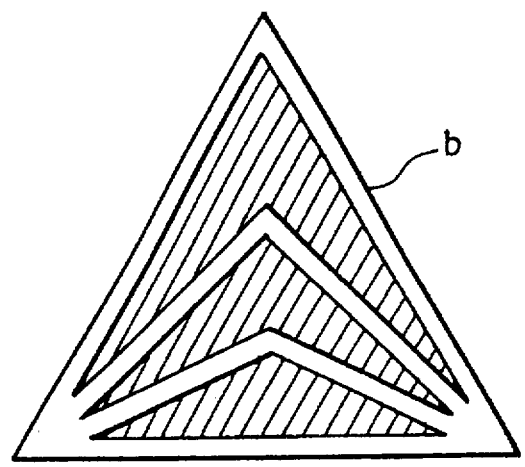
Figure 7C:
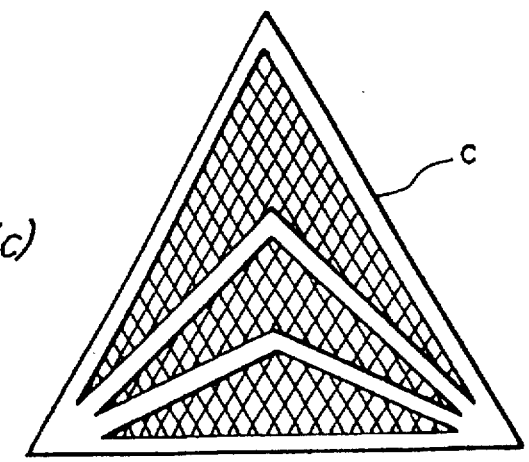
Figure 8A:
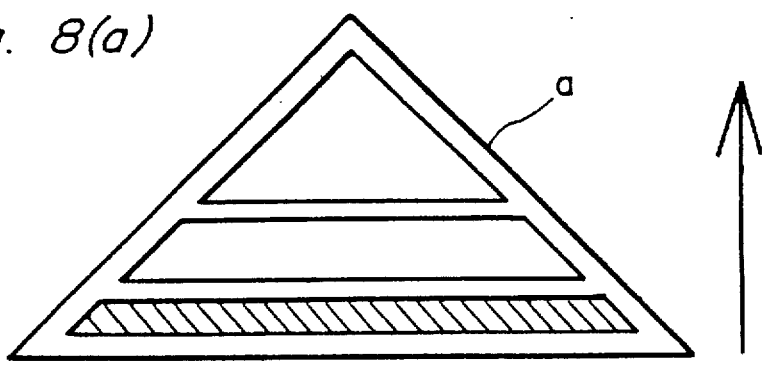
Figure 8B:
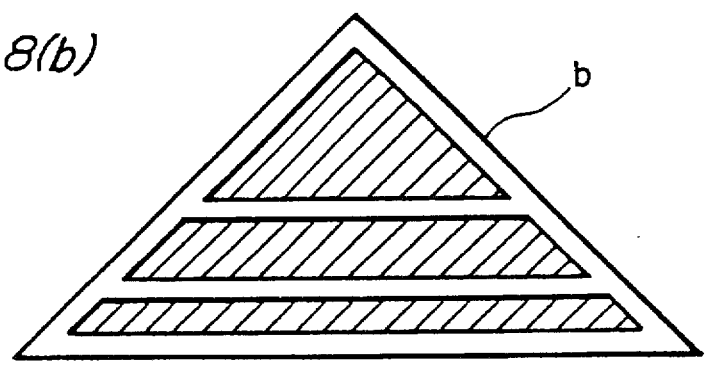
Figure 8C:
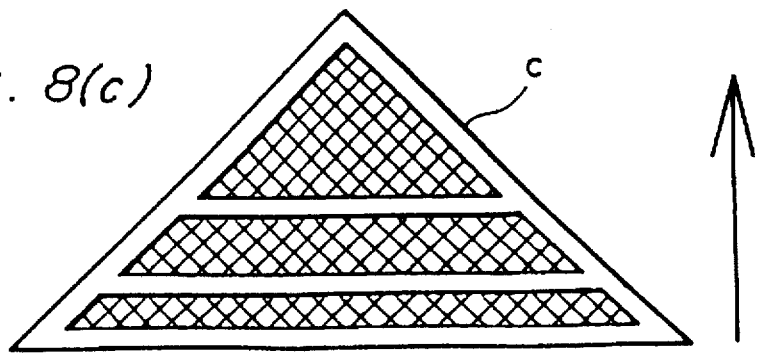
Figure 9A:
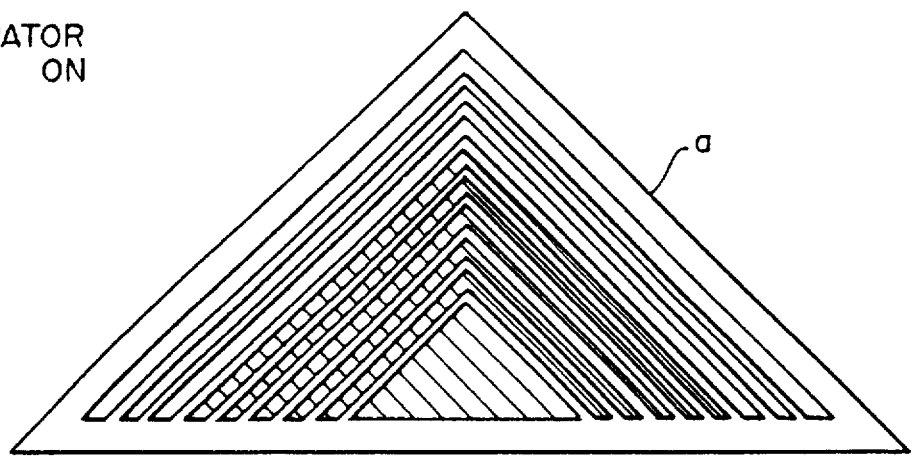
Figure 9B:
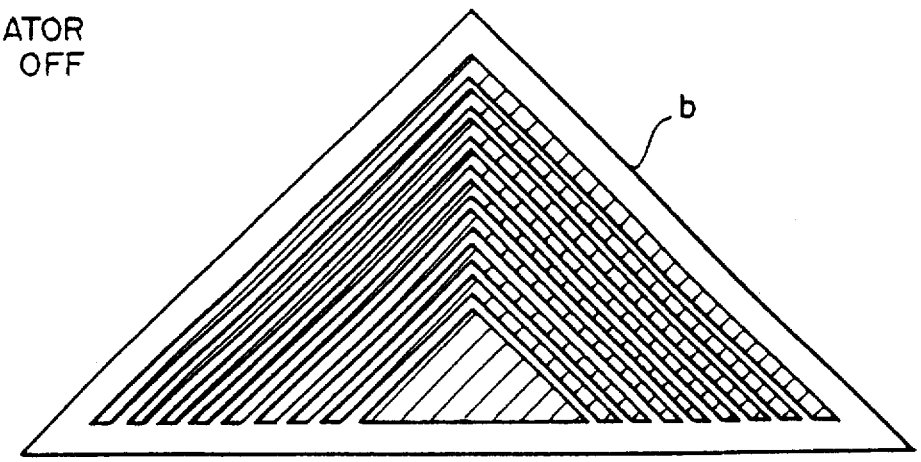
Figure 9C:
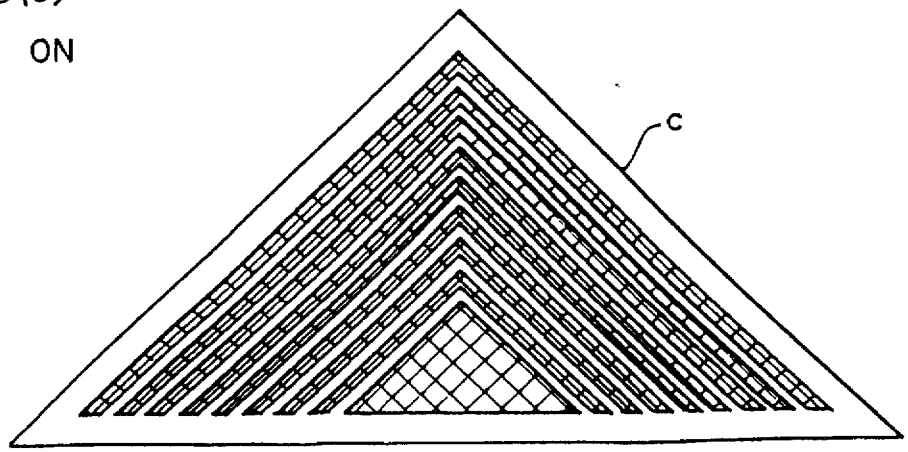
Figure 10A:
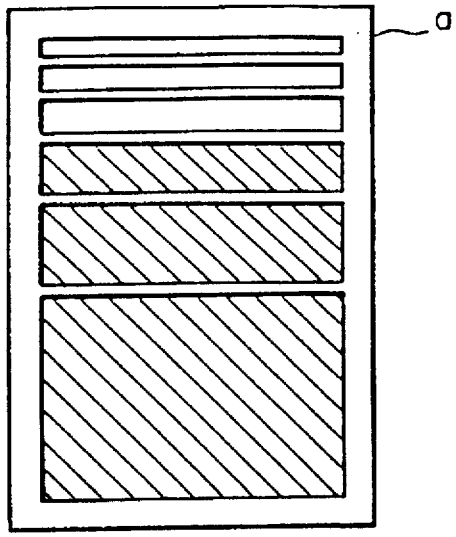
Figure 10B:
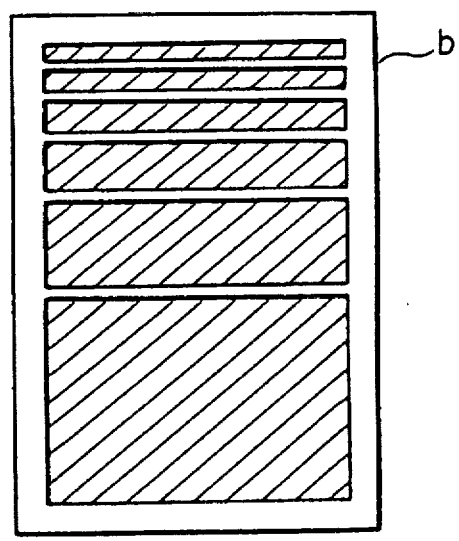
Figure 10C:
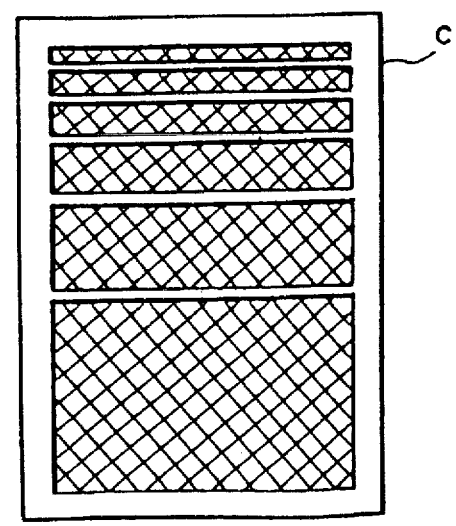
Figure 12A:
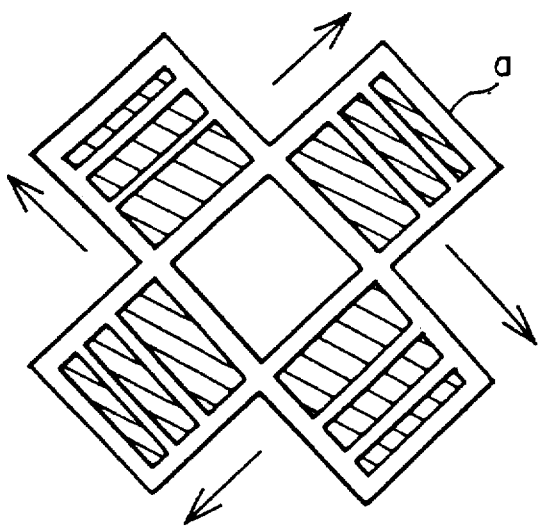
Figure 12B:
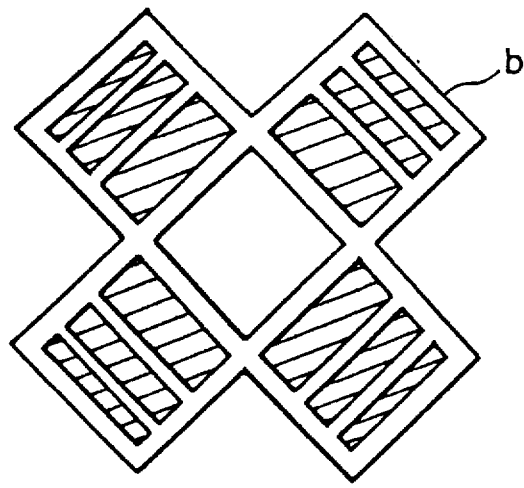
Figure 12C:
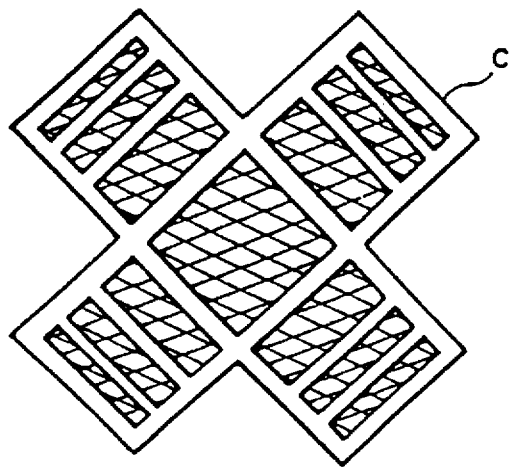
Figure 13A:
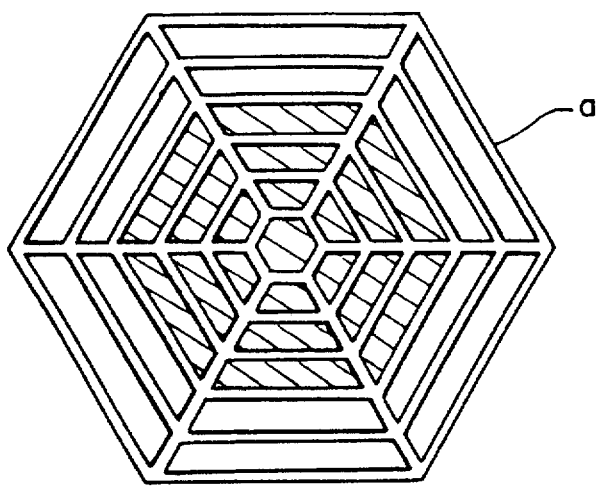
Figure 13B:
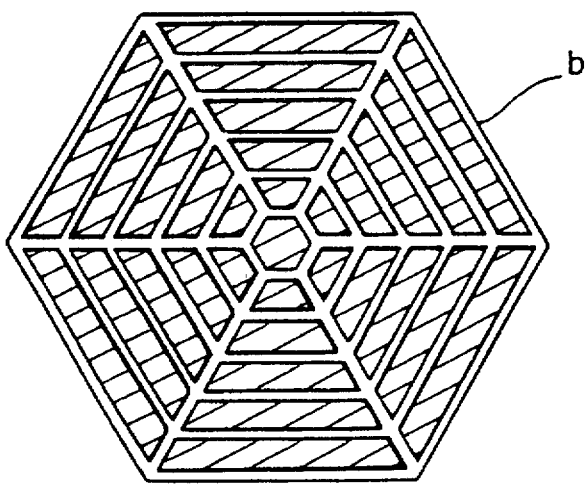
Figure 13C:
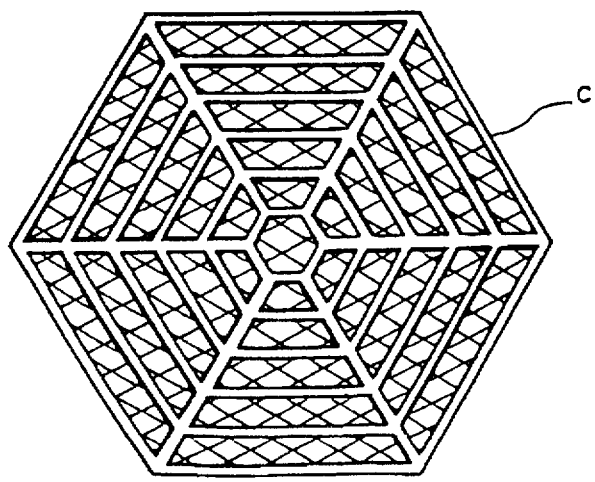

FIG. 6 shows a partially cut perspective view representing the shape of magnetic path 15. Magnetic path 15 is formed of a material such as plastic, rubber or alminium and comprises an empty cylindrical casing 16. Casing 16 comprises an inner cylindrical portion 17 and an outer cylindrical portion 18. A plurality of sliced silicon iron plates 19 is provided in the annulus between the outer cylindrical portion 18 and inner cylindrical portion 17. These plates are perpendicular to the bottom wall of casing 16 and are arranged radially around the inner cylindrical portion 17 to outer cylindrical portion 18. The casing 16 is supported by a cap or may be fixed by an acryl bond without using the cap. (This is not shown in the drawing.) Further, the silicon iron plate 19 may be formed integrally with the casing 16 or may be formed with coil 10 without using casing 16, by means of an acryl bond, for example. The outer diameter of outer cylindrical portion 18 is almost equal to the outer diameter of coil 10 used for the oscillating circuit. The sliced silicon iron plate 19 is arranged in casing 16 and the gap between the outer cylindrical portion 18 may be filled by acryl bond or glass epoxy. In the embodiment, the silicon iron plate is used as a magnetic material for forming magnetic path 15. However, any kind of magnetic material with a high permeability, such as a parmaloy (trade name) ferrite thin plate may be used.

Magnetic path 15 may be baked on a disc ring-like plate formed of ferrite.

A magnetic flux is produced when the drive pulse voltage is applied to coil 10 and the accompanying current output from one terminal of the coil passes through the magnetic path 15 and then returns to the other terminal of coil 10. The magnetic resistance of magnetic path 15 is small compared with that of the floor 14 of the automobile, which is formed of iron plate. Thus, little of the magnetic flux output from one terminal of coil 10 passes through the floor 14, most of the magnetic flux passing through magnetic path 15 and returning to the other terminal of coil 10. Accordingly, the eddy current produced in magnetic path 15 is very small, so that the magnetic flux crossing the coil 10 is not significant decreased. As a result, the sensitivity of the sensor is not significantly affected.

FIGS. 7(a), 7(b), 7(c), 8(a), 8(b), 8(c), 9(a), 9(b), 9(c), 10(a), 10(b), 10(c), 11(a), 11(b), 11(c), 12(a), 12(b), 12(c), 13(a), 13(b), 13(c), 14(a), 14(b), 14(c), 15(a), 15(b), 15(c), 16(a), 16(b), 16(c), 16(d), 17(a), 17(b), 17(c), 17(d), 18(a), 18(b), 18(c), 18(d), 19(a), 19(b), 19(c), 19(d), 20(a), 20(b), 20(c) and 20(d), show plan views of important portions of a display which can be used for an accelerator pedal operation amount display apparatus. The light emitting element is formed by arranging a plurality of light emitting apparatus on a substrate having a shape corresponding to that of the display shown in FIGS. 7(a), 7(b), 7(c), 8(a), 8(b), 8(c), 9(a), 9(b), 9(c), 10(a), 10(b), 10(c), 11(a), 11(b), 11(c), 12(a), 12(b), 12(c), 13(a), 13(b), 13(c), 14(a), 14(b), 14(c), 15(a), 15(b), 15(c), 16(a), 16(b), 16(c), 16(d), 17(a), 17(b), 17(c), 17(d), 18(a), 18(b), 18(c), 18(d), 19(a), 19(b), 19(c), 19(d), 20(a), 20(b), 20(c) and 20(d), so that the light emitting element produces green, yellow, or red light and every adjacent element produce a different color. The basic element is received in a body comprising a metal material, a plastic material and a wooden material and so on. One surface of the body can be thin so that the light emitting surface formed by the light emitting element can be observed externally.

Where the apparatus is constructed as recited above, various colors can be displayed by using a display portion selected from a to c or from a to d, as shown in FIGS. 7(a), 7(b), 7(c), 8(a), 8(b), 8(c), 9(a), 9(b), 9(c), 10(a), 10(b), 10(c), 11(a), 11(b), 11(c), 12(a), 12(b), 12(c), 13(a), 13(b), 13(c), 14(a), 14(b), 14(c), 15(a), 15(b), 15(c), 16(a), 16(b), 16(c), 16(d), 17(a), 17(b), 17(c), 17(d), 18(a), 18(b), 18(c), 18(d), 19(a), 19(b), 19(c), 19(d), 20(a), 20(b), 20(c) and 20(d). The display portion shown in a to c or a to d in FIGS. 7(a), 7(b) and 7(c) may be formed of a single color light emitting element and then arranged in a vertical or horizontal direction to perform a display.

A plurality of light emitting elements seen from said display portion can be directly exposed, but if necessary an opaque plate on which a pattern defining line is drawn may be used to hide the light emitting element.

As shown in FIGS. 7(a), 7(b), 7(c), 8(a), 8(b), 8(c), 9(a), 9(b), 9(c), 10(a), 10(b), 10(c), 11(a), 11(b), 11(c), 12(a), 12(b), 12(c), 13(a), 13(b), 13(c), 14(a), 14(b), and 14(c), the display shown by 'a' indicates the amount of operation of the accelerator. In this case, it is preferable to perform a display of a green or blue color as shown by hatching lines. The display shown by 'b' indicates the state in which the accelerator is not yet depressed. In this case, the entire display portion displays a uniform yellow or orange color. The display shown by 'c' indicates the state in which the brake is operated. In this case, the entire display portion displays a uniform red color.

Figure 15A:
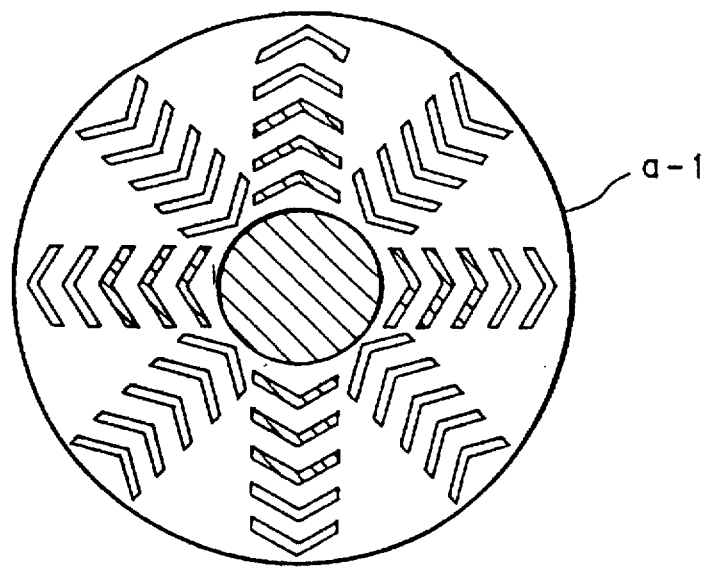
Figure 15B:
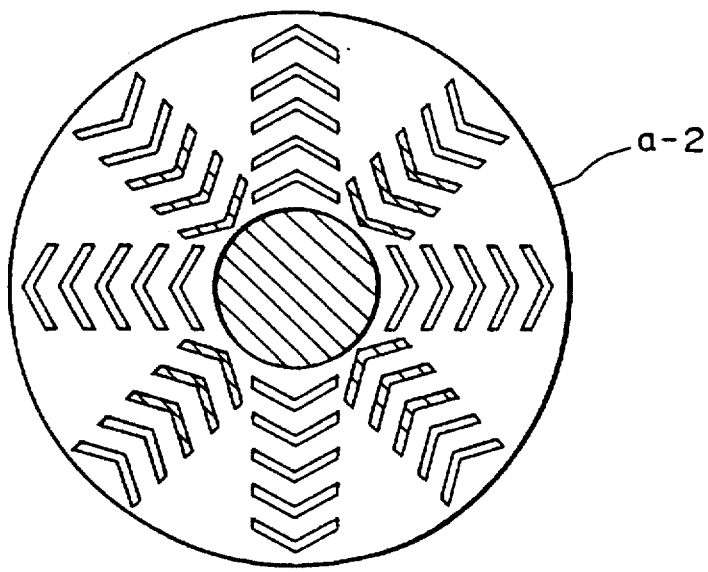
Figure 15C:
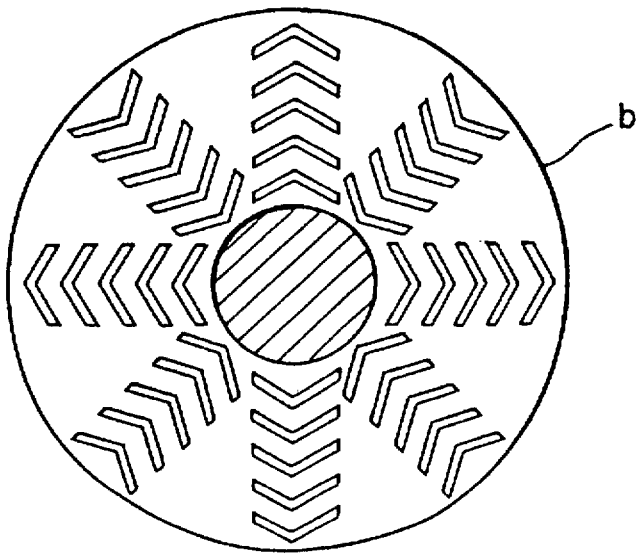

The display portion a-1 in FIG. 15(a) designates a situation in which the accelerator pedal is gradually fully depressed. Display portion a-2, shown in FIG. 15(b), designates a situation in which the accelerator is gradually returned form the fully depressed state to the original state. The color used in display portion a-2 is green or blue. Display state b, shown in FIG. 15(c), is the same as the previously described display state b, but the central portion is displayed in yellow and the portion designated by the arrows is turned off.

Display portions a to c in FIGS. 16(a), 16(b), 16(c), 17(a), 17(b), and 17(c) are the same as the already described display portions a to c. Display d in FIGS. 16(d) and 17(d) indicates an operation of an winker displayed by a driving source, not shown. The display portion moves from right to left if it flows and the color of the display portion is red.

Figure 18A:
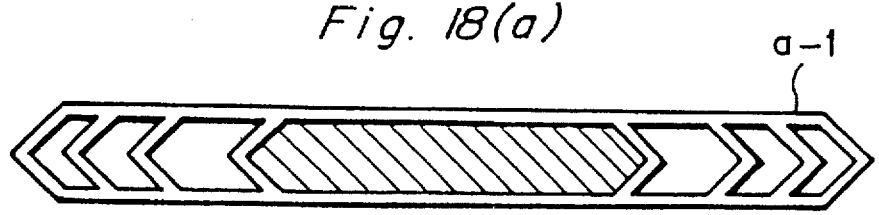
Figure 18B:
Figure 18C:
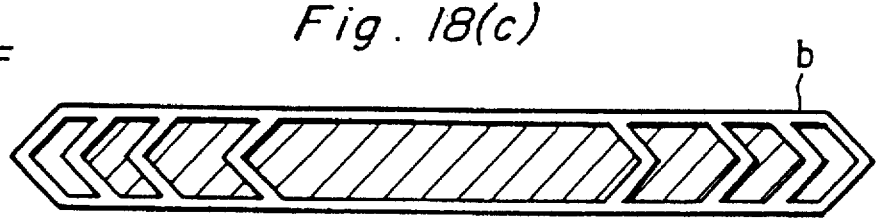
Figure 18D:
Figure 19A:
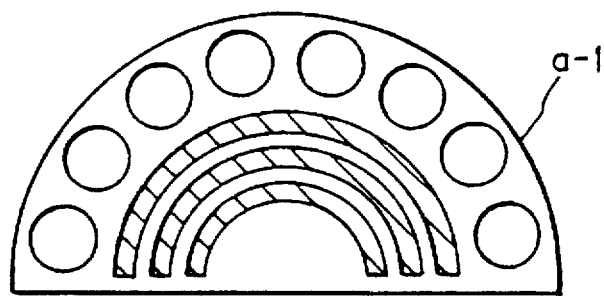
Figure 19B:
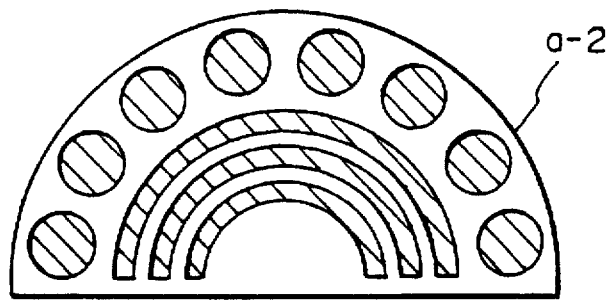
Figure 19C:
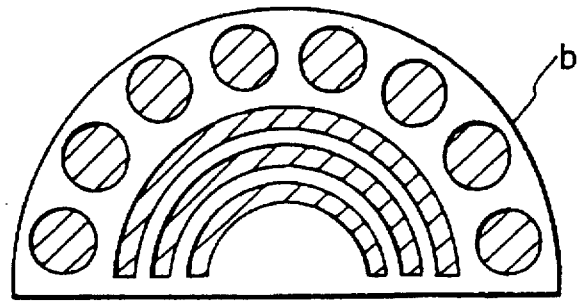
Figure 19D:
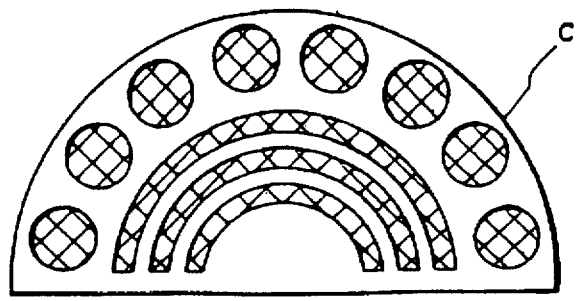
Figure 20A:
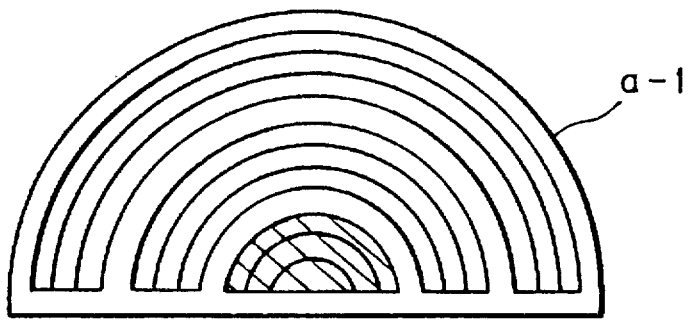
Figure 20B:
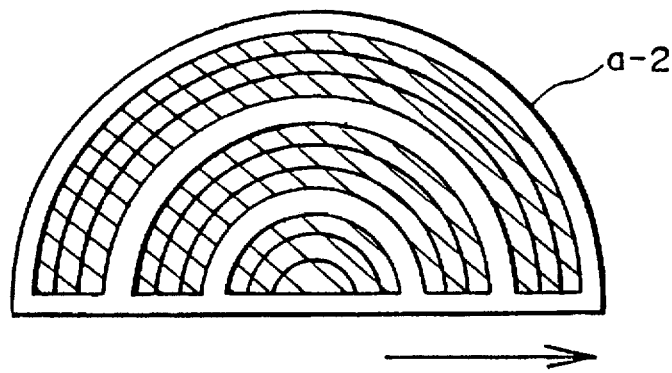
Figure 20C:
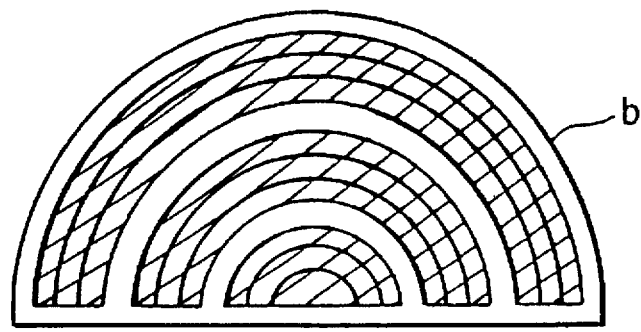
Figure 20D:
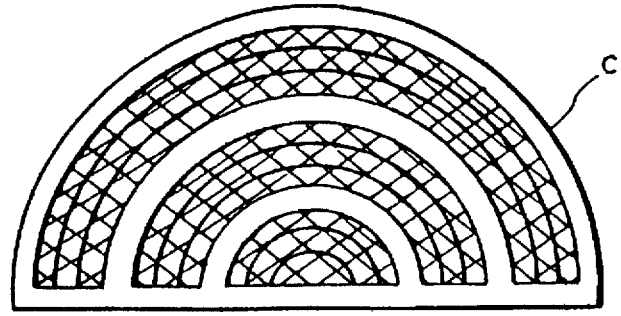
Figure 21:
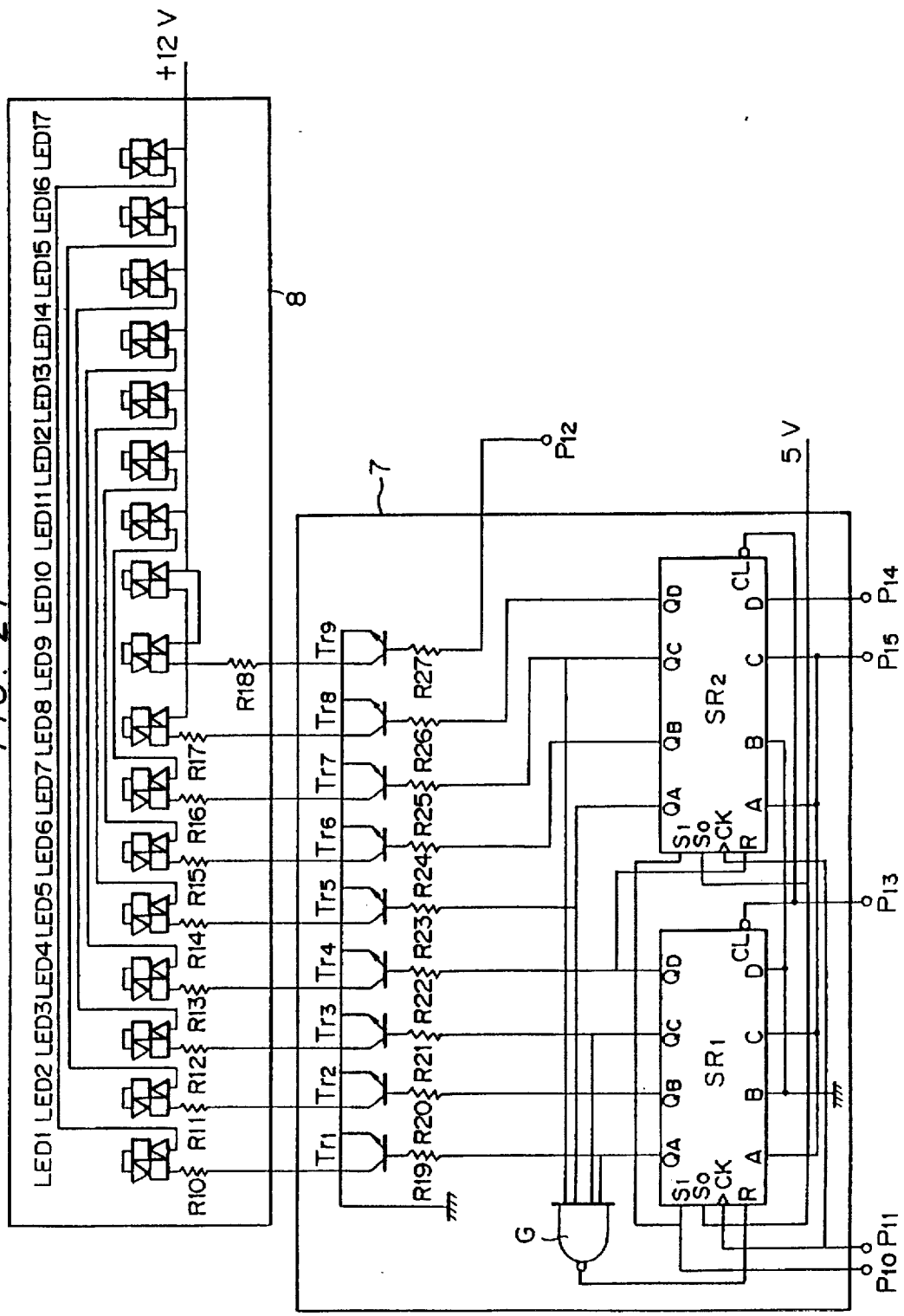
FIG. 21 is a circuit diagram of a driver and display so that the display body is observed so that it is located, FIGS. 22(a), 22(b), 22(c), 22(d), 23(a), 23(b), 23(c), 23(d), 24(a), 24(b), 24(c), 24(d), 25(a), 25(b), 25(c) and 25d), show plan views of the main part of the display body for use in a driver and display shown in FIG. 21.

The display portion a-1 shown in FIGS. 18(a), 19(a) and 20(a) designates the manner in which the accelerator is partially depressed. The color is green or blue. Display portions b and c are the same as former display portions b and c. The accelerator operation amount display apparatus constructed as recited above and operation of the display will be explained as follows. In a state in which the accelerator pedal of the automobile on which the accelerator operation amount display apparatus is mounted is fully depressed, all the green LEDs 1 to 17 are turned on except for LED 9 in FIG. 4. This explanation is made by referring to FIG. 18(b), where the display is performed as shown by to display a-2. When the accelerator pedal is partially depressed, all the LEDs are not turned on, but LEDs 8 and 10 shown in FIG. 4, for example, are turned on. Then, display is performed as shown by display portion a-1 by in FIG. 18(a). When the accelerator pedal is not depressed, for example, a yellow LED 9 is turned on. Then display is performed as shown by display portion b. When LED9 turns other LEDs on, namely, when the accelerator pedal is depressed, the input port P18 is turned to "L" level so that the LED is turned off. In the embodiment, the light emitting element is formed of an LED, but it may be formed of a white-heat electric valve. In FIG. 4, only one or two light emitting elements driving by transistors TR1 to TR9 of driver 7 are shown, but with the displays shown in FIGS. 7(a), 7(b), 7(c), 8(a), 8(b), 8(c), 9(a), 9(b), 9(c), 10(a), 10(b), 10(c), 11(a), 11(b), 11(c), 12(a), 12(b), 12(c), 13(a), 13(b), 13(c), 14(a), 14(b), 14(c), 15(a), 15(b), 15(c), 16(a), 16(b), 16(c), 16(d), 17(a), 17(b), 17(c), 17(d), 18(a), 18(b), 18(c), 18(d), 19(a), 19(b), 19(c), 19(d), 20(a), 20(b), 20(c) and 20(d), a parallel connection, for example, is adopted to increase the number of light emitting diodes required for the element to achieve an appropriate number. FIG. 21 shows the detailed structure of an example of a driver 7 and a display a for use in a display apparatus which is different in type from the previously explained display apparatus. In FIG. 21, driver 7 comprises a ring counter for combining an amplifier comprising transistors Tr1 to Tr8, resettable shift registors SR1 and SR2, and the gate of the nand operation. The bases of respective transistor are connected to parallel output terminals 9a to 9d of the shift registers SR1 and SR2 and base of transistors TR9 is connected to the output port P12 of MPU1 through registor R27. The emitter of respective transistors are commonly grounded and the collectors or transistor TR1 to TR8 are connected to one of the terminals of corresponding light emitting elements LED1 to LED8 through corresponding registors R10 to R17. Therefore, the other terminals of light emitting elements LED1 to LED8 are connected to the lus terminal of the power source (not shown) through corresponding light emitting elements LED10 to LED17. The collector of transistor TR9 is connected to the plus terminal of the power source through light emitting element LED9.

Pre-set terminals a to d of shift registers SR1 and SR2 are determined by the left bit to be "H" and then "L" and "H" is alternately repeated in a right direction. In order to perform the later described operation, pre-set terminals a and b of shift resistor SR1 and SR2 are connected to output port P15 and MPU1 and the pre-set terminal d of shift registor SR2 is connected to the output port P14 of MPU1. One S0 of the mode selection terminal is connected to the plus power terminal (5V) and the other S1 of the terminal of the mode selection terminals is connected to the output port P10 of the MPU1. The clock input terminal CK and clear terminal CL are connected to the output port P11 and P13, respectively, of the MPU1. The parallel output terminal Q0 of shift register SR1 is connected to the serial input terminal R of shift register SR2, and parallel output terminals QA and QC or shift registors SR1 and SR2 are input to the gate G and the output is connected to the serial input terminal R of shift registor SR1. This amplifier is provided between output ports P0, P11, P13, P14 and P15 and the shift registors.

Figure 22A:
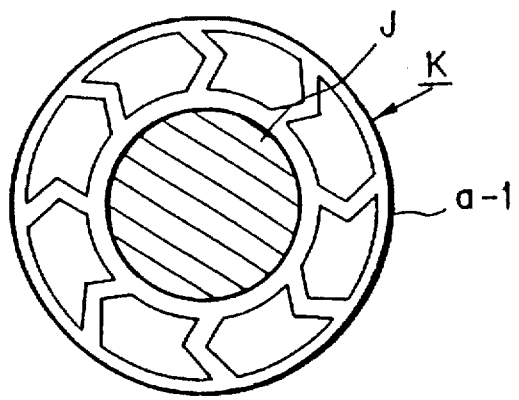
Figure 22B:
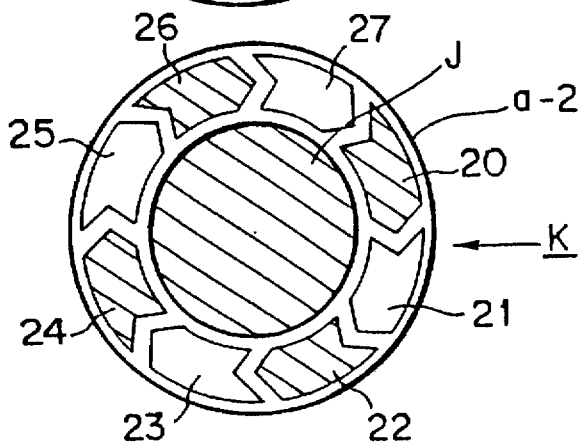
Figure 22C:
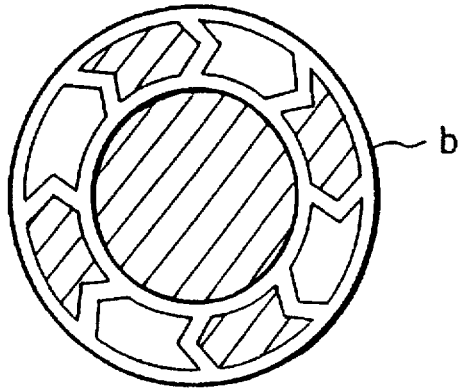
Figure 22D:
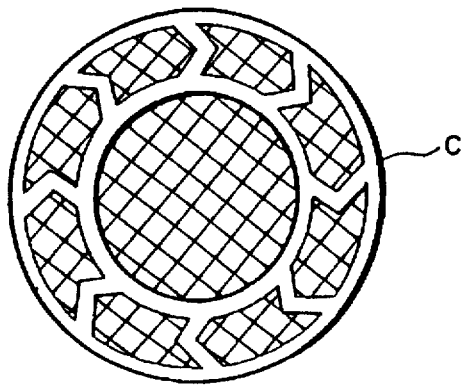
Figure 23A:
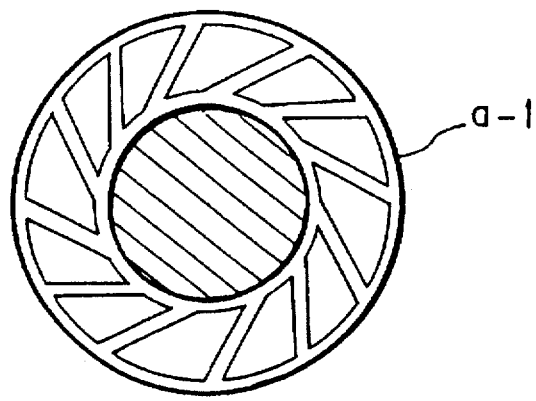
Figure 23B:
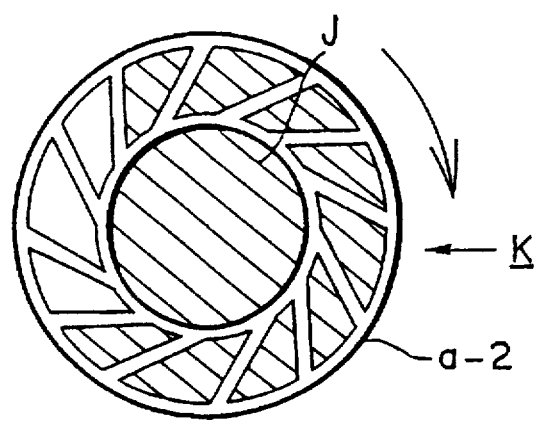
Figure 23C:
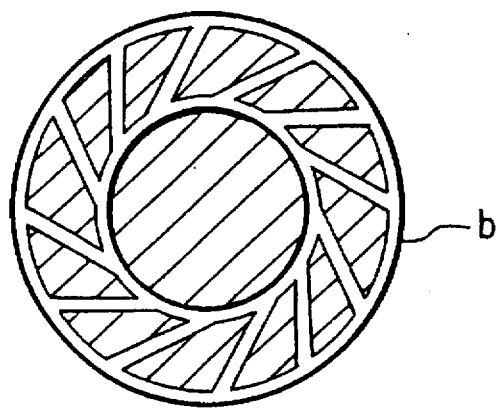
Figure 23D:
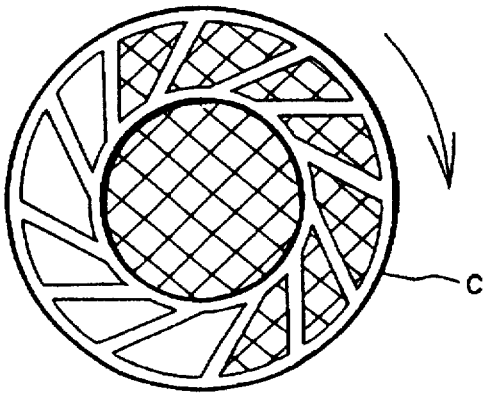
Figure 24A:
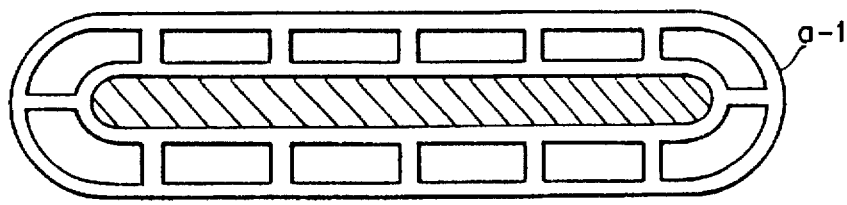
Figure 24B:
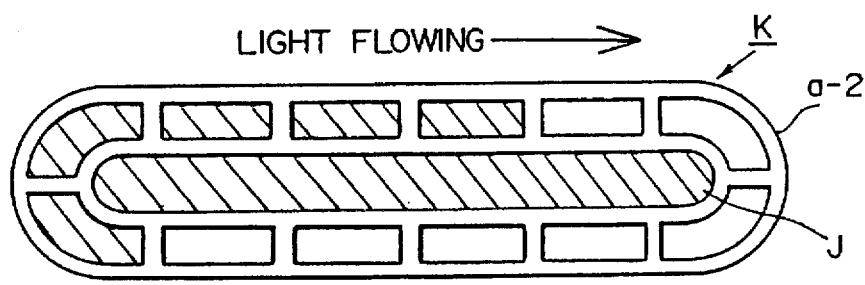
Figure 24C:
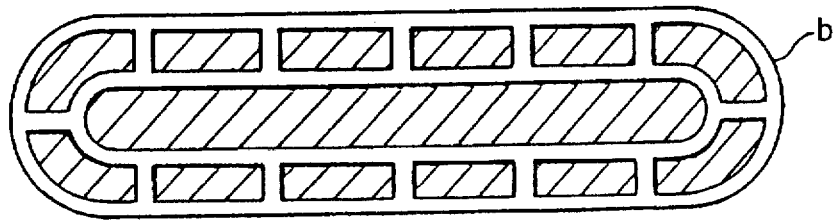
Figure 24D:
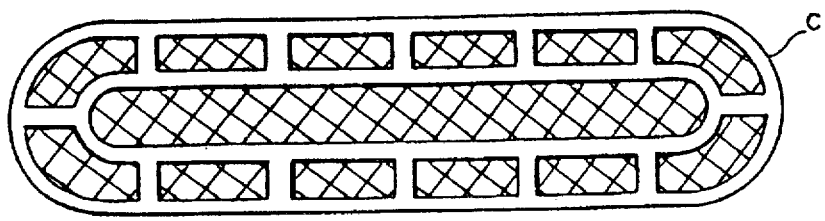
Figure 25A:
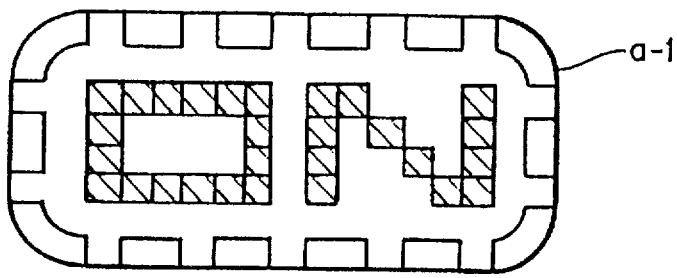
Figure 25B:
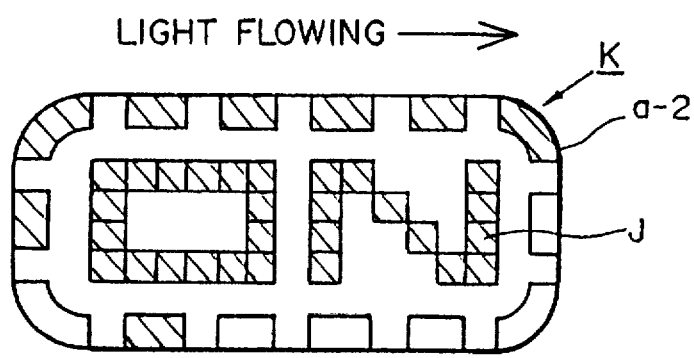
Figure 25C:
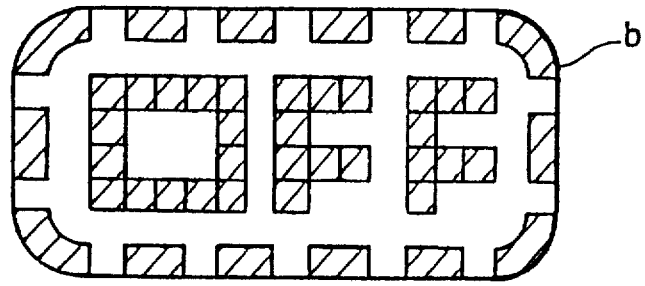
Figure 25D:
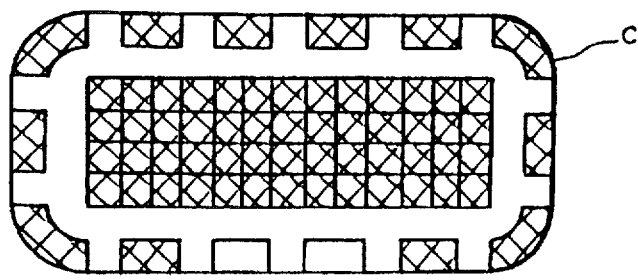

FIGS. 22(a), 22(b), 22(c), 22(d), 23(a), 23(b), 23(c), 23(d), 24(a), 24(b), 24(c), 24(d), 25(a), 25(b), 25(c), and 25(d) are plan views designating the same portions of different types of display. The display body shown in Figure comprises a central display unit J and the outer field display unit K surrounding the central display unit J. Outer field display unit K is formed by making cylindrical defined display portions 20 to 27 (FIG. 22(b)) continuous. The light emitting element is formed by arranging a plurality of light emitting elements such as green, yellow and red light emitting elements on a substrate whose shape corresponds to the shape of the display shown in respective figures so that the adjacent light emitting elements are of different colors. The substrate is provided in a case formed of a metal material or wood, for example, and a light emitting surface formed by a light emitting element can be observed externally from the side of the case. As constructed above, the same display portion selected from one of the display portions (a-1, a-2) to c shown in FIGS. 22(a), 22(b), 22(c), 22(d), 23(a), 23(b), 23(c), 23(d), 24(a), 24(b), 24(c), 24(d), 25(a), 25(b), 25(c), and 25(d) can perform a various kinds of color display. The display portions a (a-1, a-2) to c can be formed in the same way by a single-color light-emitting element as described above, and may be arranged horizontally or vertically to be displayed separately. A plurality of light emitting elements which can be observed from the display portion may be exposed directly. By providing a faced plate such as an opaque plate for defining a line if necessary, the light emitting element may be hidden.

In the display as constructed above, the light emitting element for displaying the amount of accelerator operation, selected from the light emitting element belonging to the defined display portions, is connected and driven by transistors Tr 1 to Tr 7 (FIG. 21). The light emitting element for representing the amount of accelerator operation, selected from the light emitting element of the central display unit J, is connected so that it is displayed through the transistor Tr8.

In FIGS. 22(a), 22(b), 22(c), 22(d), 23(a), 23(b), 23(c), 23(d), 24(a), 24(b), 24(c), 24(d), 25(a), 25(b), 25(c), and 25(d), display unit a-1 represents a state in which the accelerator pedal is slightly depressed and display unit a-2 represents a state in which the accelerator pedal is depressed more deeply than in display unit a-1. The reason why the arrow is displayed, is that the outer wheel display unit K rotates more quickly when the accelerator pedal is depressed more deeply.

Display unit b designates a state in which the accelerator is not operated, namely, a state in which power is not applied to the accelerator pedal. In the display mode a-2, the portions which can be observed when the rotation is stopped are displayed in yellow or orange color. Display portion c designates, by a driving source, a state in which the brake is operated, and the entire display is uniformly red. As in the circuit diagram in FIG. 21, the other driving source can enable a red color rotation display in association with an operation of the brake pedal in the same way as the amount of the operation of the accelerator pedal is displayed. The light emitting element relating to this manner of display is performed by transistor Tr9.

Where the state of the input ports of comparator 5 is changed to "H" level, MPU1 determines which of ports P1 to P9 is turned to "H" level, and determines the frequency of the clock supplied to shift registors SR1 and SR2 from output port P11 outputted to driver 7, and the signal of the frequency is supplied to the clock input terminal CK of shift registors SR1 and SR2.

The signal to be compared, which is input to comparator 5, is determined to be in a state in which the sensor 3 is fixed under the accelerator pedal such that the frequency of the driving signal of the sensor of the resonance circuit is previously determined. Thus, the signal to be compared becomes a maximum when the accelerator pedal is not depressed. When the accelerator pedal is fully depressed, the difference between the voltage of the signal to the compared and the maximum voltage is obtained. In this embodiment the voltage is divided into 9 steps and resistors R0 to R9 of controller 6 are determined so that respective voltages are supplied to comparator 5 as reference voltages. For example, where the maximum voltage is 5V and the voltage of the signal to be compared when the accelerator pedal is fully depressed is 0.6V, the difference between the maximum voltage and the voltage of the signal to be compared is 4.4V. Accordingly, by the operation of output ports P1 to P9, voltages of 4.4V, 3.91V, 3.42V, 2.93V, 2.44V, 1.96V, 0.98V and 0.49V are supplied sequentially to the comparator 5 as reference voltages. If the voltage corresponding to the state in which the accelerator pedal is most deeply depressed, i.e., 0.6V is supplied as the signal to be compared, the output of the comparator 5 becomes "H" level when the output port P9 is in "H" level, i.e., when the reference voltage of the comparator 5 is 0.49V. Therefore, MPU1 supplies a shift pulse of the highest frequency from the output port P11 to the shift registor of the driver 7. Immediately before this timing, MPU1 determines the output port P15 at "H" level and the output port P15 at "L" level and thereafter turns the output port P11 to "H" level. Thus, the left end bits of the parallel outputs of shift registors SR1 and SR2 are determined as "H". Thus, "L" and "H" are alternatively repeated in the rightward direction. Therefore, when the accelerator pedal is fully depressed, the display portion a-2 in FIGS. 22(b), 23(b), 24(b) and 25(b), the state in which the display portion a-2 rotates at the maximum speed, can be observed. When the amount of depression of the accelerator pedal is reduced to less than the state in which the accelerator pedal is fully depressed, the frequency of the shift pulse outputted from the output port P11 is lowered. As a result, the rotation speed of the external wheel display portion K is decreased. When the accelerator pedal is depressed a little bit, and 4.2V is supplied as the signal to be compared, namely, the reference voltage of comparator 5 is 3.91V, the output of comparator 5 becomes "H" level. Therefore, MPU1 produces a control signal of "L" level from the output port to the clear terminal of shift registors SR1 and SR2, thereby clearing the parallel state of the shift registors SR1 and SR2. Next, the output port P14 is turned to "H" level, then the output port P15 is set to "L" level and thereafter one shot pulse of "H" level is transmitted from output port P11 to mode selection terminal S1. As a result, only transistor Tr8 becomes conductive and the shift pulse is not supplied to output port P11. Accordingly, in this state, only central display unit J is displayed as shown in the portion in FIG. 22 to FIG. 25. Display portion a-1 is shown in FIGS. 22(a), 23(a), 24(a) and 25(a). When the accelerator pedal is not depressed, output port P14 is turned to "L" level and output port P12 is turned to "H" level. Thus, for example, a yellow LED9 is turned on, thereby performing a display as shown in display portion b. Output port P11 is turned to "L" level, so that LED9 is not extinguished, whereas an LED is turned on when the accelerator pedal is depressed. In this embodiment, the LED uses a light emitting element, but the light emitting element may be of the white-heat electric type.

In FIG. 21, only one or two light emitting elements driven by transistors Tr1 to Tr9 of the driver 7 are shown for respective transistors. In this case, the display elements shown in FIGS. 22(a), 22(b), 22(c), 22(d), 23(a), 23(b), 23(c), 23(d), 24(a), 24(b), 24(c), 24(d), 25(a), 25(b), 25(c), and 25(d) are driven, the number of light emitting elements for respective transistors is increased, for example, by a parallel connection. A circuit diagram of the driver and the display shown in FIG. 21 shows a ring counter composed of two ICs, but it may be formed of a ring counter comprising three ICs and the state of the pre-set terminal can be adequately changed in accordance with the manner of display. The output port may be operated by software and may be subjected to a rotation display without using a ring counter.

Figure 26:
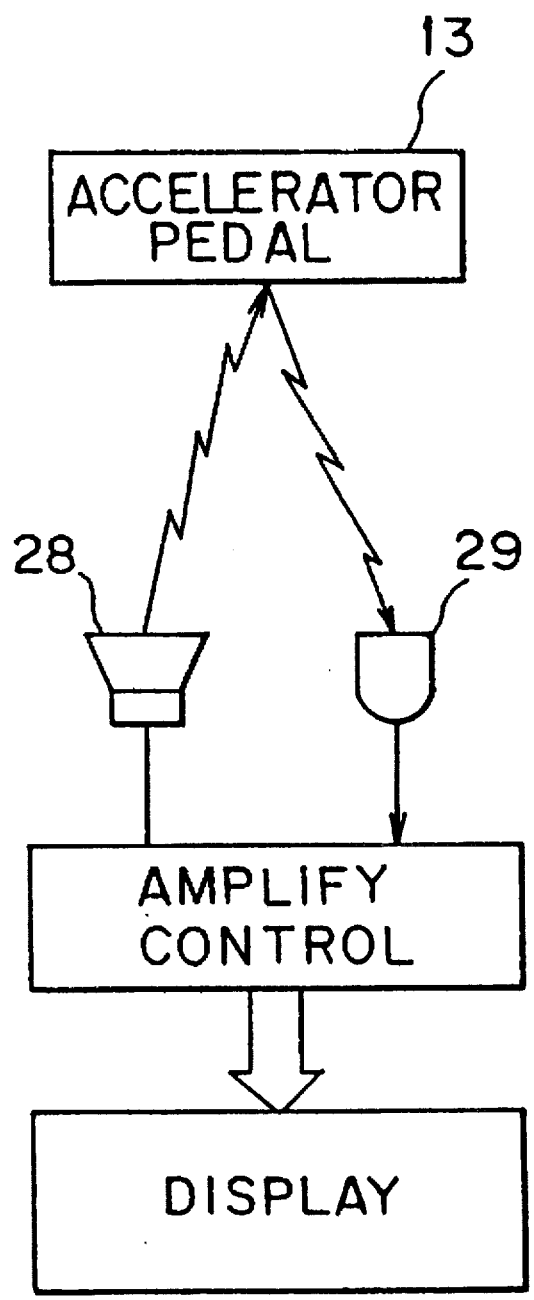
FIG. 26 is a schematic diagram of a model of a structure for detecting the degree of the operation of the accelerator pedal by using the ultrasonic sound wave.

Sensor 3 may be formed of various kinds of circuit in addition to the parallel oscillation circuit as described above. The reciprocating movement of the accelerator pedal is converted to a rotation movement through a rack and pinion and the rotation axis of the rotary encoder is moved, together with the rotation of the pinion and the digital output designating the state of the rotation displacement is read by the MPU through an interface, thereby controlling display 8. As shown in FIG. 26, an oscillation body 28, such as a speaker for producing an ultrasonic sound wave, and an oscillation sensing body 29, such as a microphone for receiving the ultrasonic waves reflected from the under surface of the accelerator pedal 13, are provided under accelerator pedal 13. The strength and weakness of the reflected ultrasonic wave in accordance with a contact and operation of the accelerator pedal with and from oscillation body 28 and oscillation sensing body 29 is detected by oscillation sensing body 29 while a car is driven and, based on the detection, MPU1 may control display 8 as described above. Instead of oscillation body 28 and oscillation sensing body 29 a reflection type photo interrupter may be used. In this case, a white reflecting paper is attached to the under parts of the accelerator pedal 13 or white paint is coated on the under part of the accelerator pedal 13 and the reflected light is detected by a reflection type photo interrupter. Further, an elastic device such as spring may be attached to the accelerator pedal. In this case, spring pressure is transmitted to a pressure sensor such as a strain gage in accordance with the pressure caused by the operation of the accelerator pedal and display 8 may be controlled based on the output of the pressure sensor, as described above.

Figure 27:
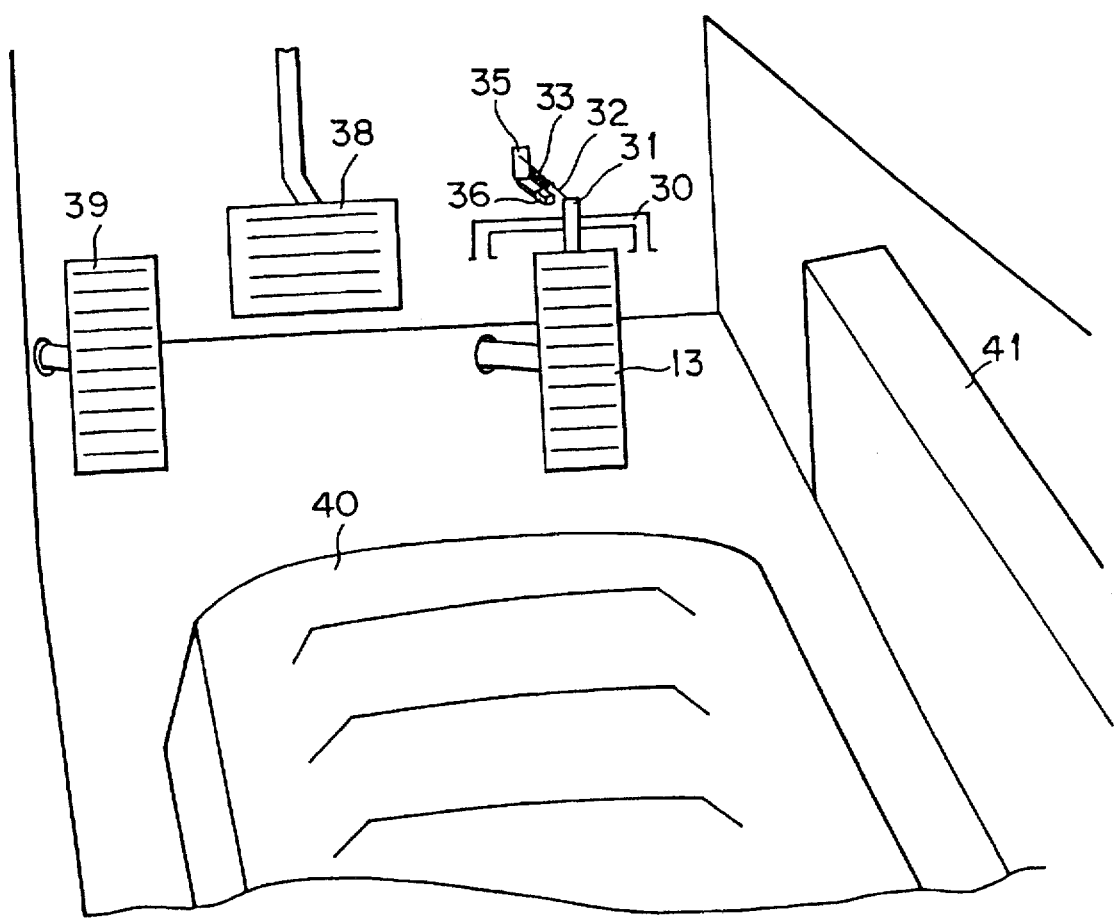
FIG. 27 shows a schematic drawing of a model of a structure for detecting the degree of the depression of the accelerator pedal by using a variable resistor.
Figure 28:
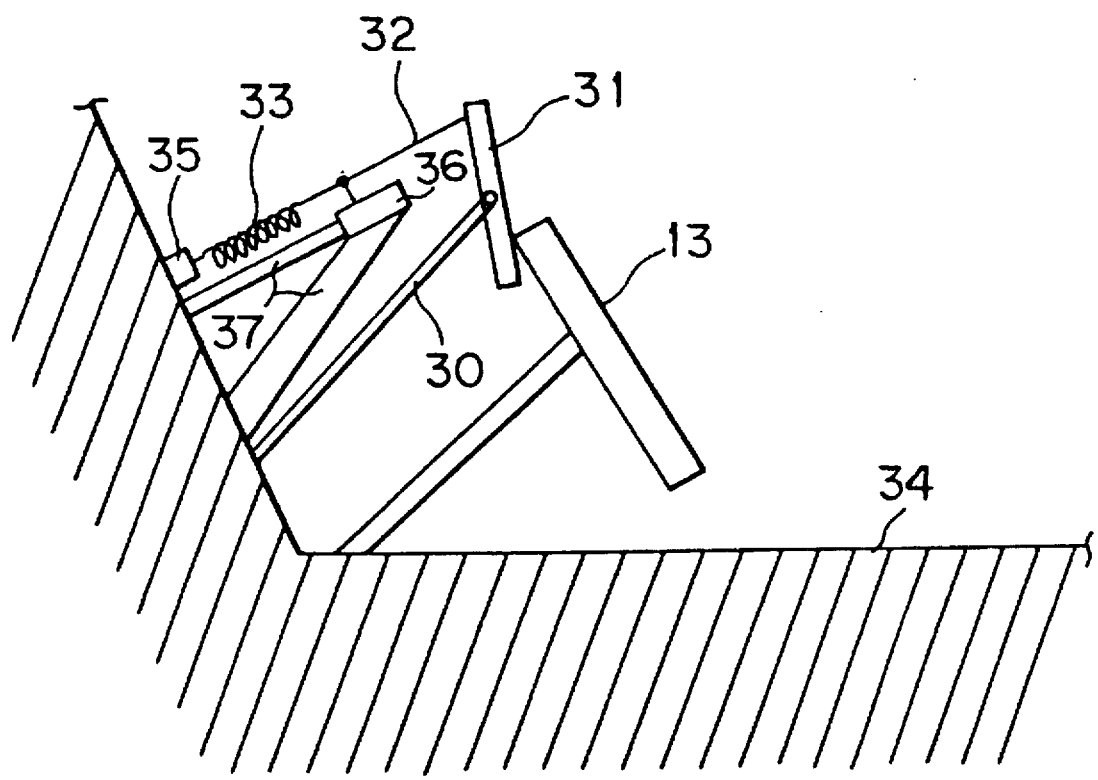
FIG. 28 shows a sectional view of a main part shown in FIG. 27.

FIG. 27 is a schematic view of another structure for detecting the amount of depression of the accelerator and FIG. 28 is a schematic view of the main part thereof. Swinging plate 31 pivoted at an end of supporting member 30 is provided near accelerator pedal 13 and the under part of swinging plate 31 is positioned so that it opposes against the upper end of the lower surface of the accelerator pedal is. On the other hand, thin wire rope 32 is attached to the end of swinging plate 31 and spring member 33 is provided to the other end of wire rope 32. The other end of the spring member 33 is dconnected to engaging member 35 fixed to the vehicle body 34. A slidable variable resistor 36 is fixed near the connection portion with spring member 33 of wire rope 32 by supporting member 37, and the adjustment rod of variable resistor 36 is fixed to wire rope 32.

When accelerator pedal 13 is depressed, the engaging portion of swinging plate 31 is pressed by the upper end portion of accelerator pedal 13 and swinging plate 31 is rotationally displayed with the pivoting portion as the center of the rotation. As a result, the upper end of swinging plate 31 is displayed such that is upper end is raised and, following this displacement, wire rope 32 is moved. Therefore, the adjustment rod of variable resistor 36 is displaced in accordance with the movement of the wire rope and the value of resistance 3 is varied. In this structure, a sliding type variable resistor is used by a rotation type variable resistor may be used in combination with a structure in which the reciprocating movement is converted to a rotation movement by a structure such as a rack and pinion. In FIG. 27, brake pedal 38 is provided on the left side of accelerator pedal 13 and the left brake pedal 38 clutch pedal 39 is provided. Seat 40 is shown in front of, accelerator pedal 13, brake pedal 38 and clutch pedal 39, the door pocket 41 is shown on the right side of the seat 40.

Figure 29:
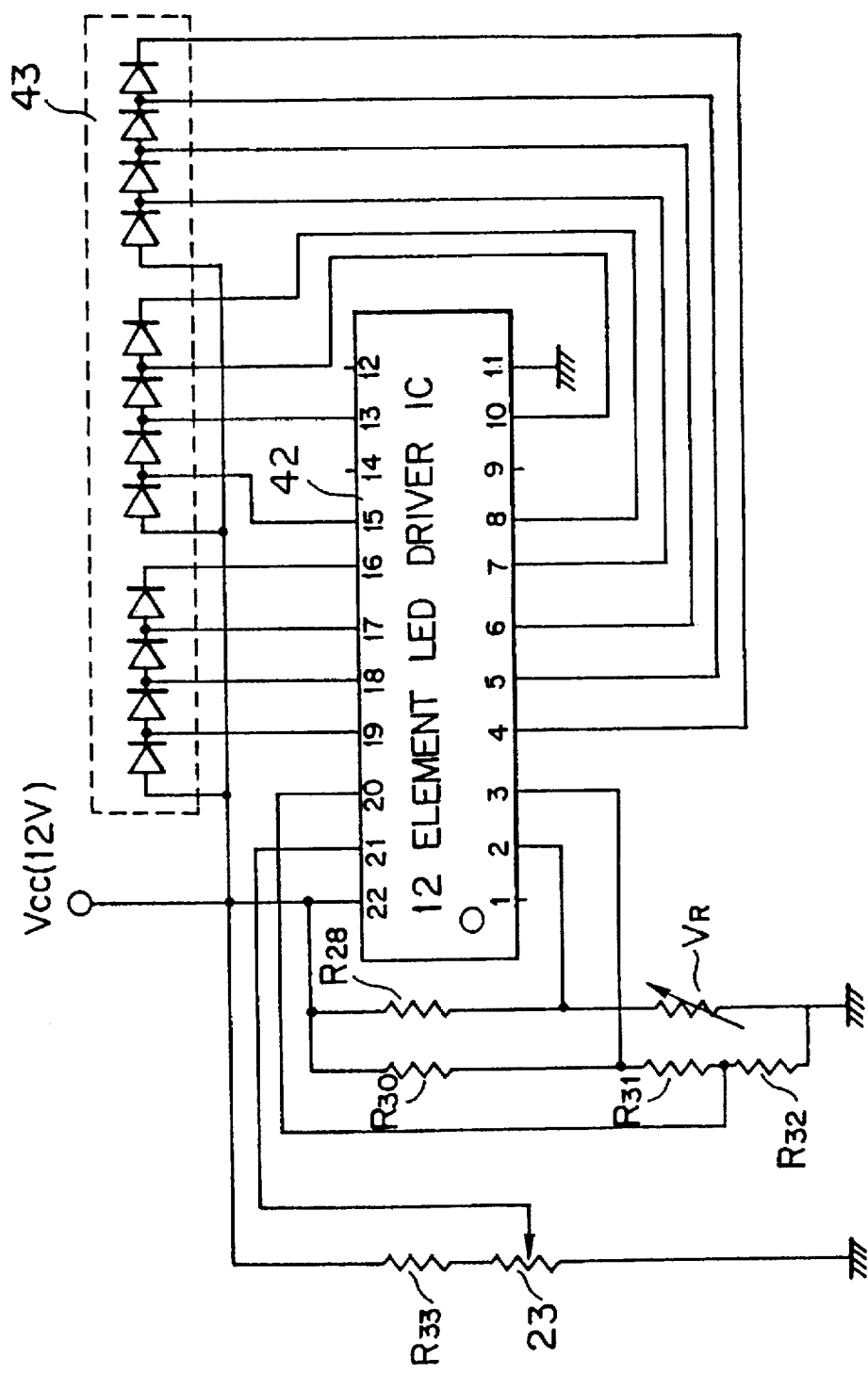
FIG. 29 is a circuit diagram of a display for utilizing 12 element LED driver IC, FIGS. 30(a), (b) and (c) are the drawings of the example of the display body for designating the number of the rotation of the engine, the display of the degree of depression of the accelerator pedal and the depression or non-depression of the brake pedal.

The electrical circuit connected to the variable resistor 36 as a sensor is almost same as that shown in FIGS. 1, 3 and 4, or is obtained by modifying the electrical circuit shown in FIGS. 1, 3 and 4. In this embodiment, the electronic circuit shown in FIG. 29 is used. In FIG. 29, 12 is an LED driver IC (called driven IC hereinafter), 42 is an integrally provided with comparator. Matrix circuit and element LED driver IC is an IC for a bar graph display and is sold on a market to replace a VU meter of an audio amplifier (for example, this IC is may be an IR-2433 manufactured by Sharp Corporation). The 12 element LED driver 42 shown in FIG. 29 comprises 12 elements, but, by performing a cascade connection of driver IC 42, many more elements may be driven in a precise manner. The output of driver IC 42 is connected to display 43 equipped with 12 LEDs. The second pin divides the power source Vcc by using resistor R28 and variable resistor $V_R$ so that the maximum value of the reference voltage of the installed comparator is provided through the second pin. The 20th pin divides the power source Vcc by using resistors R30, R31 and R32 so that the minimum value of the reference voltage of the comparator is supplied and the divided value of the voltage is set in accordance with the voltage drop of resistors R30 to R32. By setting the maximum and minimum values of reference voltage, voltages between the maximum and minimum values are divided into 12 and are supplied to respective installed comparators. The third pin is the for controlling the current flowing through the LED of display 43 and for adjusting the current by appropriately determining the values of resistors R30, R31 and R32. It is preferable for LEDs to be constructed so that their left ends are yellow and their other ends are green when they emit light.

Although not shown in FIGS. 27 and 28, the voltage power source Vcc is supplied to variable resistor 36 through resistor R33, as shown in FIG. 29. The voltage, which varies in accordance with the movement of the adjustment rod, is outputted from the sliding terminal and the output is supplied to the 21st terminal of driver IC 42. In accordance with the variation of output voltage from low level to high level, the emitting light is extended from the right to the left end of display portion 43. If display portion 43 is divided into two parts comprising a left part and a right part, the LEDs on both sides are driven in units of two, then light is emitted toward both ends from the center of display portion 43 in accordance with the movement of the accelerator pedal when the accelerator pedal is depressed more deeply. When such structure is used, and if the driving power of the LED is lacking, the LED may be driven after the driving power is amplified by an amplifying element such as a transistor. Further, the right emitting apparatus may be formed so that it can be seen from a remote distance, by arranging 10 units of a single LED, thereby producing a high light intensity. In this case, the driving power may be amplified by an amplifying element.

The above explanation is related to the apparatus for displaying the amount of operation of the accelerator. A structure similar to that of the above embodiment may be provided on the brake pedal side and, for example, a red light may be emitted in accordance with the amount of the depression of the brake pedal, and such display may by pionrovided in parallel with the accelerator apparatus, as described above.

The structures shown in FIGS 1 to 6 and 26 to 29 may be applied to the inside-vehicle display apparatus for enabling a driver or passenger, within the automobile to detect the status of the driving with ease.

Detecting the amount of the depression of the brake pedal may be structured in the same way in which the amount of depression of the accelerator pedal is detected. Instead of sensor 3 formed by a parallel oscillating circuit, an oscillation sensing circuit such as a microphone or a pick-up may be provided in an appropriate portion of the engine cavity, and the output of the oscillation sensor is input to detecting circuit 4. In this case, naturally, it is unnecessary to provide a rectangular wave to the sensor from the sensor driving unit. Accordingly, formation of the wave is not necessary. The operation is very similar to the operation in which the amount of operation is displayed by detecting the amount of depression of the accelerator pedal or brake pedal. Inside-vehicle display apparatus is realized by combining at least one, or two or all of the display based on the amount of depression of the accelerator pedal. The display of the amount of depression of the pedal and the display of the number of rotations of the engine may be provided within an automobile, for example, in a position suitable for seeing from the rear seat of a taxi cab, or in a single portion, or in plural portions which are easily seen by the passengers of a bus.

Figure 30A:
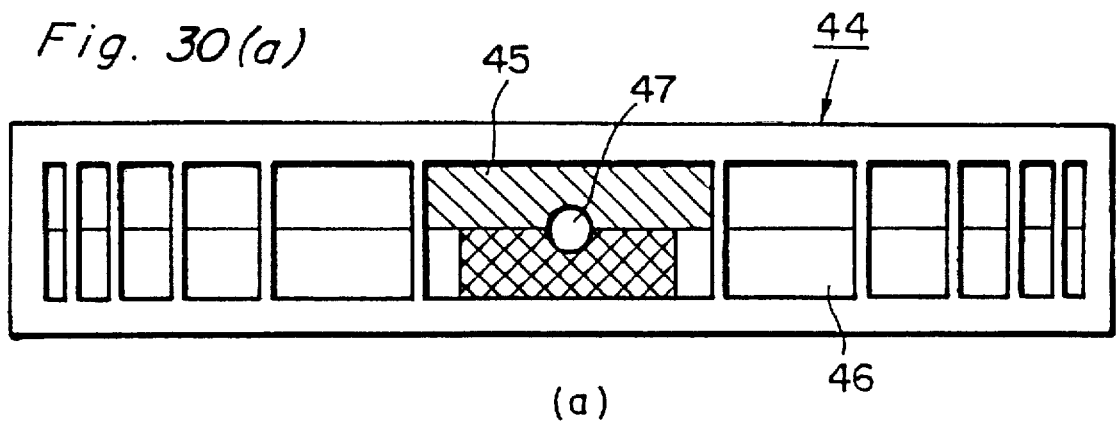
Figure 30B:
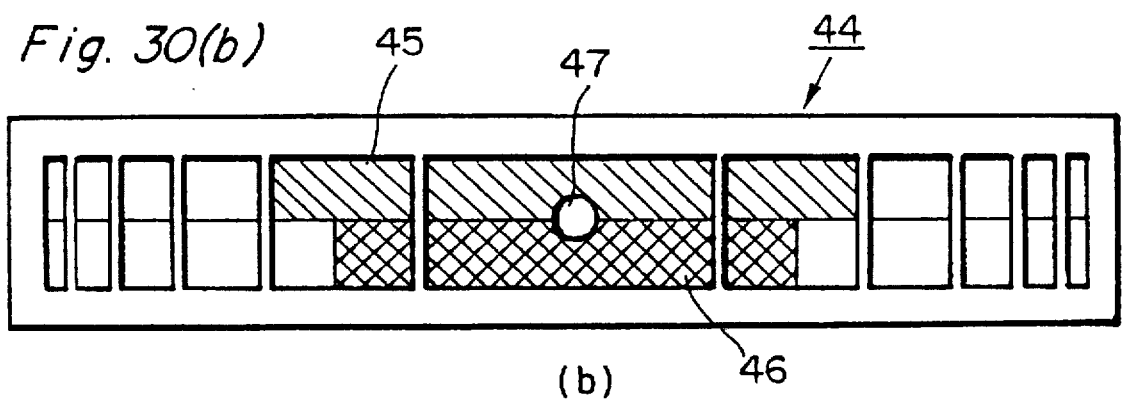
Figure 30C:
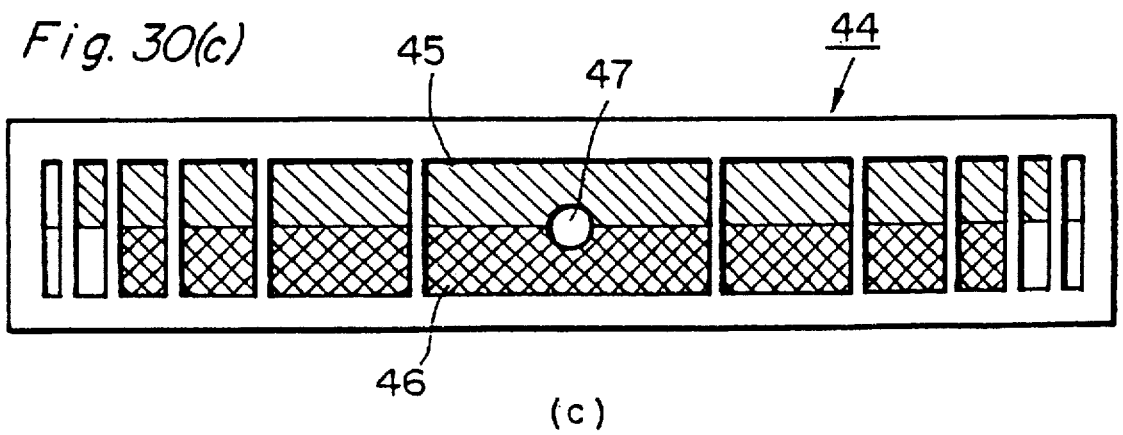

FIG. 30 shows a plan view of main part of one example of display apparatus equipped with the inside-car display apparatus. In FIG. 30, display body 44 is formed into a flat parallelopiped in which a print board arranging a lot of light emitting elements such as high intensity type LEDs is received. A half region of the upper side from the center in a longitudinal direction of the display 44 for display portion 45 for displaying the degree of stepping on of the accelerator pedal and upper and low half area of the display 44 forms display unit 46 for displaying the degree of the number of rotation of an engine. A circularly defined area provided at the center of display 44 and this area presents brake pedal operation display unit 47 which emits a light when the brake pedal is stepped on. The light emitting element provided on respective display is connected to the driver shown in FIG. 4 and the driver IC 42 shown in FIG. 29 is provided at a double structure so that the light emission is extended in left and right side of the display body 44 and after the output of driver IC 42 amplifies by amplifying element such as transistor and thereafter display is driver. The emission is shifted in a sequence FIG. 30(a), (b) and (c) and light emission is expanded toward left and right direction of the display 44 in accordance with increase of the number of rotation of the engine. Although not shown in FIG. 30, the switch which is close when the brake pedal is stepped on is provided near the brake pedal and the light emitting element is lit upon closing the switch. As described above, a driving and running status such as the status of the operation of the brake pedal, the degree of the stepping on of the accelerator pedal or the degree of the number of the rotation of the engine is shown within an automobile and then the person other than the driver can understand the driving and running status. Therefore, when the car runs at a high speed, the person can grasp a handle or back supporter and thereby can deal with the danger in advance.

Figure 31:
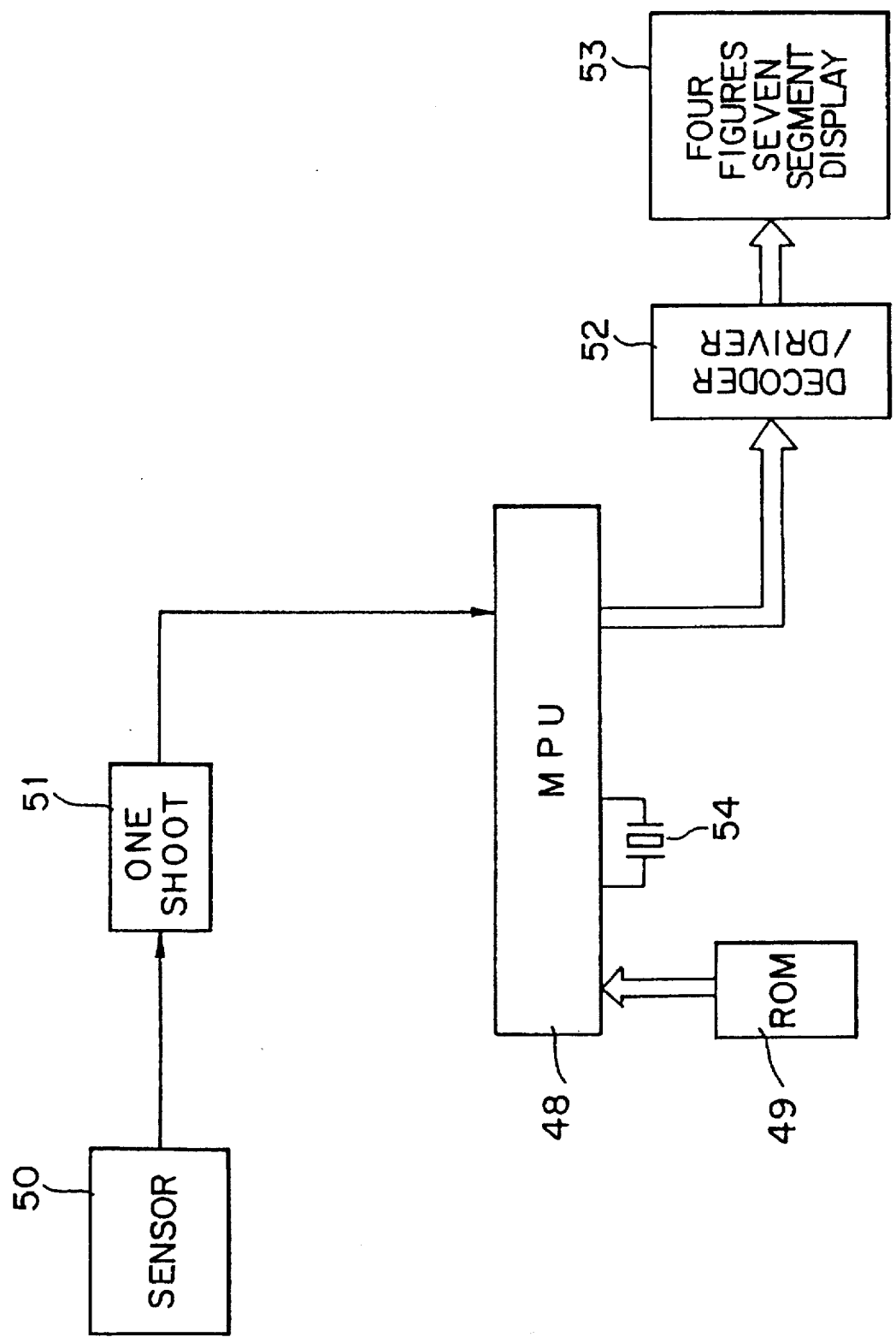
FIG. 31 is a block diagram of an apparatus for displaying the number of the rotation of the engine by using a numerical data so that the numerical data can be observed externally.

FIG. 31 shows a block diagram of a display apparatus for displaying the number of rotation of an engine outside the automobile. In FIG. 31, micro processor unit (which is called MPU hereinafter) 48 comprises a so-called one chip micro processor equipped with CPU, RAM, parallel input and output port, timer and clock oscillator circuit. The program executed by MPU 48 is written in ROM 49 and ROM 49 is electrically connected to MPU 48 through the data bus and address bus, for example.

The output of sensor 50 for detecting the number of the engine is input to one shot multi vibrator 51, the output of which is input to an input port of MPU48.

On the other hand, the output port (16 bits) of MPU1 outputs a signal to decoder/driver 52, the output of which is input to 7 segment display 53 comprising 4 bits. Crystal oscillator 54 is provided for a clock oscillation.

Figure 32:
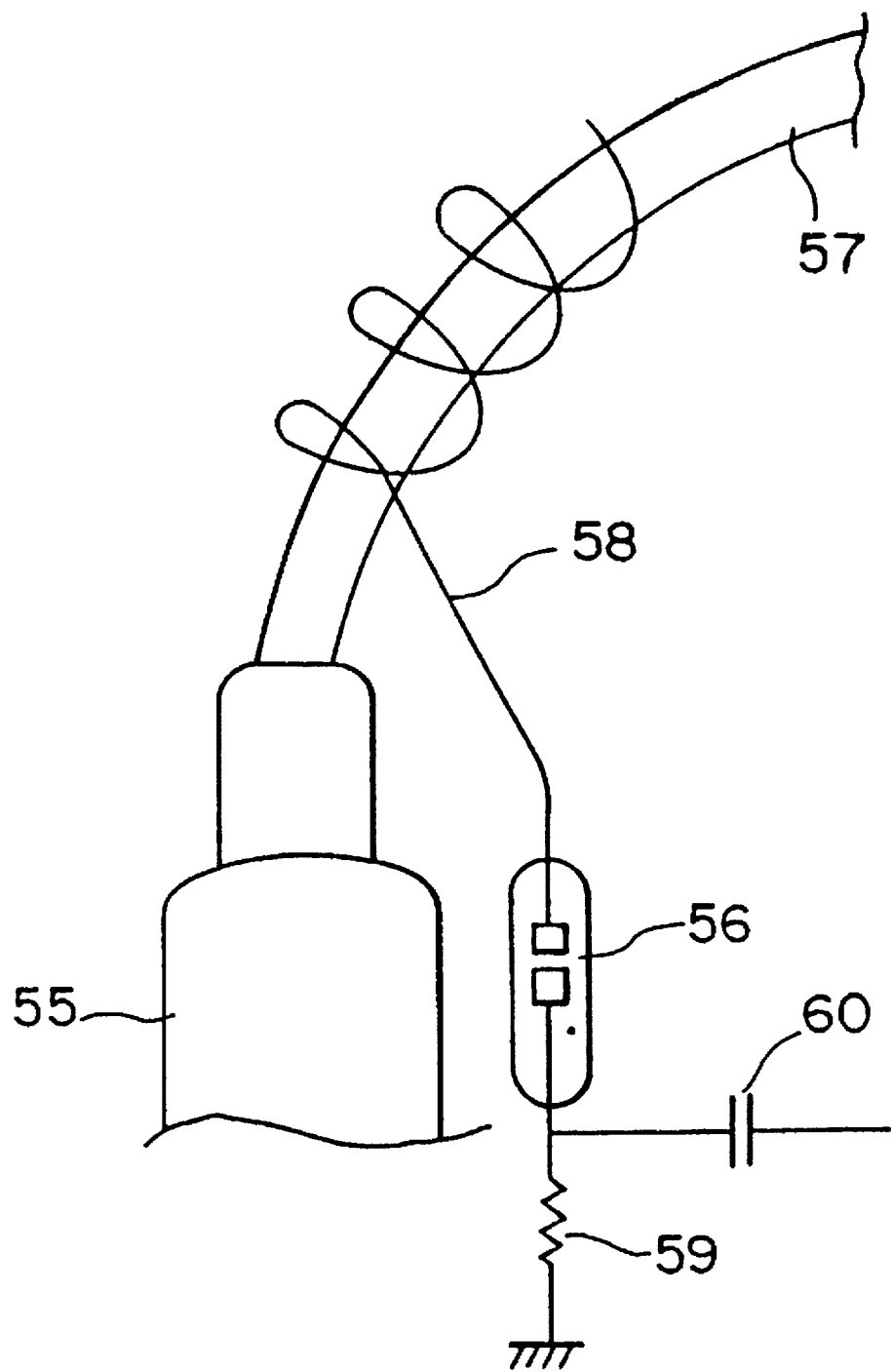
FIG. 32 is a drawing of a schematic structure designating one example of the sensor for detecting the number of rotation of the engine.

The various kinds of sensor 50 can be used. For example, as shown in FIG. 32, a neon lamp can be utilized. In FIG. 32, neon lamp 56 is provided close to spark plug 55 and one electrode of neon lamp 56 is connected to a terminal of electric line 58 wound on high voltage introducing code 56 connected to spark plug 55. The electrode of neon lamp 56 is connected to a lead line on one side of condenser 60 and resistor 59 and the other side of lead line of resistor 59 is grounded. The lead line wire of the other side of condenser 60 and resistor 59 are connected to the other electrode of the neon lamp 56 and the other side of the lead wire of resistor 59 is grounded. And the other side of the condenser 60 is connected to one shot multi vibrator 51 not shown in FIG. 32 through a lead wire and supplies a trigger signal to one shot multi vibrator 51. As means for detecting the number of rotation of the engine, oscillation sensing sensor such as microphone a pickup is provided at an appropriate location of the engine room and the output of the oscillation sensing sensor is rectified and smoothed and further amplified thereafter is input to A/D converter. The digital numerical valued obtained by the A/D converter is processed by MPU 48 and the number of the rotation of the engine can be displayed on 7 segment display 53 comprising 4 bits.

7 segment display 53 comprising 4 bits is formed by arranging 4 displays for 7 segment displays with a same size as the package of for 20 cigarettes in an appropriate case. This is provided on a rear portion of the bonnet of the automobile and when the display is performed, the numerical value can be read from the inside of the following car.

A timer interruption process program for managing the state of the input port in which the output of one shot multi vibrator 51 is provided is written into ROM 49. When spark plug 55 is subject to a sparking, then neon lamp 56 is lit and a current flows through resistor 59 and the voltage drop is supplied to one shot multi vibrator 51 through condenser 60 as a trigger signal. As a result, one shot multi vibrator 51 outputs a single pulse with a constant width to the input port of MPU 48. When the state of the input port is changed from "L" to "H", the content of the resistor or the content existing in a predetermined address of the RAM which operates as a counter is incremented by accordance with the interruption process. The process is repeated every time the state of the input port is changed as described above. According to the other interruption process of ROM 49, the content of the resistor operating at the counter is read out every second and the content obtained by multiplying the output of the counter by 60 is written in a predetermined address of RAM, and the process of clearing the content of the resistor is performed.

CPU within MPU 48 reads the content multiplied by 60 from RAM by a control of the main program and is converted into BCD and further the content is outputted to the output port. This process is updated every second. The data of the number of rotation of the engine outputted to the output port is decoded by decoder/driver 52 and input to 7 segment display 53 comprising 4 digits. Therefore, the respective segments are respectively driven and the rotation number corresponding to the data of the number of the rotation is displayed on the 7 segment display 53 comprising 4 digits.

Degree of the number of rotation of the engine is displayed outside the automobile. By using a structure for designating the degree of the actual operation which in FIGS. 1, 3 and 4 without being modified, In this case, as a sensor for detecting the degree of the number of rotation of the engine, the oscillation sensing sensor such as a microphone and pickup provided at an appropriate position of the engine room and the output of the oscillation sensing sensor is input to detecting circuit for performing a rectification, smoothing and direct current amplification and is displayed in the same manner as the degree of the operation of the accelerator is displayed.

Figure 33:
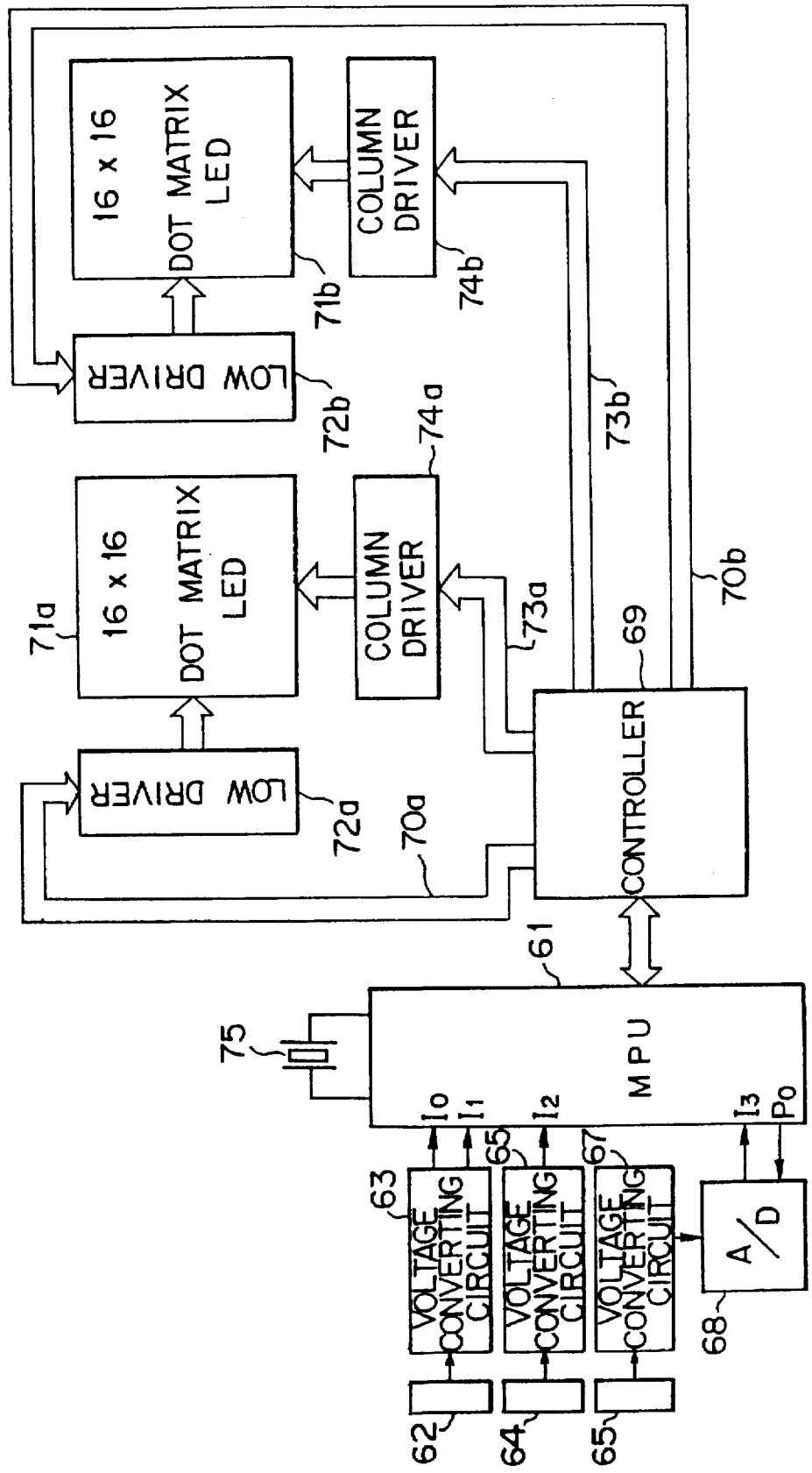
FIG. 33 shows a drawing of the block diagram of a main part of the vehicle operation status display apparatus.

FIG. 33 shows a block diagram of a main structure of an apparatus for displaying the operation of the vehicle by respective displaying an actual movement of the vehicle or the stepping state in accordance with the current situation.

In FIG. 33, MPU (micro processor unit) 61 comprises a micro computer equipped with CPU, ROM, RAM, parallel input and output port, timer and clock oscillating circuit and the program executed by CPU and is provided in MPU 61 is written in ROM.

The detection output of the acceleration detecting signal 22 is input to the voltage converting circuit 63 and the voltage converting circuit 53 has an acceleration detecting output and the deceleration detecting output which are applied to input ports I0 and I1 of MPUs 61. The detection output of brake operation detecting sensor 64 is applied to voltage converting circuit 65 for converting a variation of detected physical quantity into variation in voltage and the output of voltage converting circuit 65 is applied to an input port I2 of the MPU1. The output of running speed of detecting sensor 66 for detecting the running speed of the vehicle is input to voltage converting circuit 67 ad the output of the voltage conversion circuit 67 is applied to an analog input terminal of A/D converting circuit 68. A/C converting circuit 58 outputs the result of the digital conversion in a serial manner and the output terminal is input to input port I3 of MPU 61. The output port P0 of MPU61 outputs the digital conversion result requesting signal for requesting the A/D converting circuit 68 to output the result of the digital conversation to the input port I3 bit-bit.

On the other hand, the display apparatus for the operational status of the vehicle is equipped with controller 69 for controlling the display for performing a display in accordance with a detection status of acceleration and deceleration detection sensor 62, brake operation detection sensor 64 and a running speed detection sensor 66. Controller 69 has two pairs of character generator, address decoder, address counter and oscillating circuit, further interface circuit (PPI) with MPU 61. Controller 69 may be formed on a substrate by combining EPROM and CMOS-IC but may be informed of exclusive controller IC which is integral as a single IC. Output line 70a of one of the character generators of controller 69 is connected to display (16×16 dot matrix LED) 71a through low driver 70a and the other of the character generators of controller 69 is connected to display 71b through low driver 72b. The output line 73a of one of the address decoders of controller 69 is connected to display 71a through current driver 74a and the output line 73b of the other address decoder of controller 69 is connected to the display 71b through current driver 74b. In accordance with an associated operation with address counter and the oscillation circuit, display 71a and 71b are dynamically driven for every one column as known in the prior art. MPU 61 is connected to controller 69 through interface circuit (PPI) and the predetermined input and output terminals of interface circuit are connected to the data bus, control bus and address bus of MPU61.

The acceleration and deceleration detection circuit is not shown in the drawing but is formed by providing a pressure sensor such as a strain gage at a terminal of the case comprising plastic, glass, metal and other material and with a cylindrical for rectangular shape. A liquid such as oil and glycerin is previously sealed in the case in a condition where the pressure is applied to the liquid. The terminal surface on which the pressure sensor is provided is attached to an appropriate position inside the automobile in the front or rear portion of the traveling direction of the vehicle. Accordingly, where during the running period of the vehicle, acceleration and deceleration detection sensor 62 is fixed to the front side of the vehicle in the traveling direction, the pressure is decreased upon acceleration and the pressure is increased upon deceleration. In contrast, the acceleration and deceleration detection sensor 62 is fixed to the rear portion of the vehicle in the traveling direction, the pressure is increased upon acceleration and the pressure is decreased upon the deceleration.

A bride circuit, an acceleration detection comparator and deceleration comparator having on and off operation controlled by the output of the bridge circuit are provided in the pressure converting comparator are input to said input port I0 and I1. Brake operation detection sensor 64 is formed by a switch for performing an opening and closing operation in accordance with the operation of the brake pedal and a comparator is provided in voltage converting circuit 65 connected to the switch. The output of the comparator is input to input port I2.

Running speed detecting sensor 68 comprises a small type of dynamo provided by combining known mechanical structure so that the dynamo can rotate in accordance with the rotation of the wheel and output of the running speed detection sensor 68 is rectified, smooth and direct current-amplified and thereby is converted to the analog voltage varying in accordance with the variation of the number of the rotation of the wheel and is applied to A/D converting circuit 58. Crystal oscillator 75 is for generating a clock signal of the MPU 61.

Figure 34:
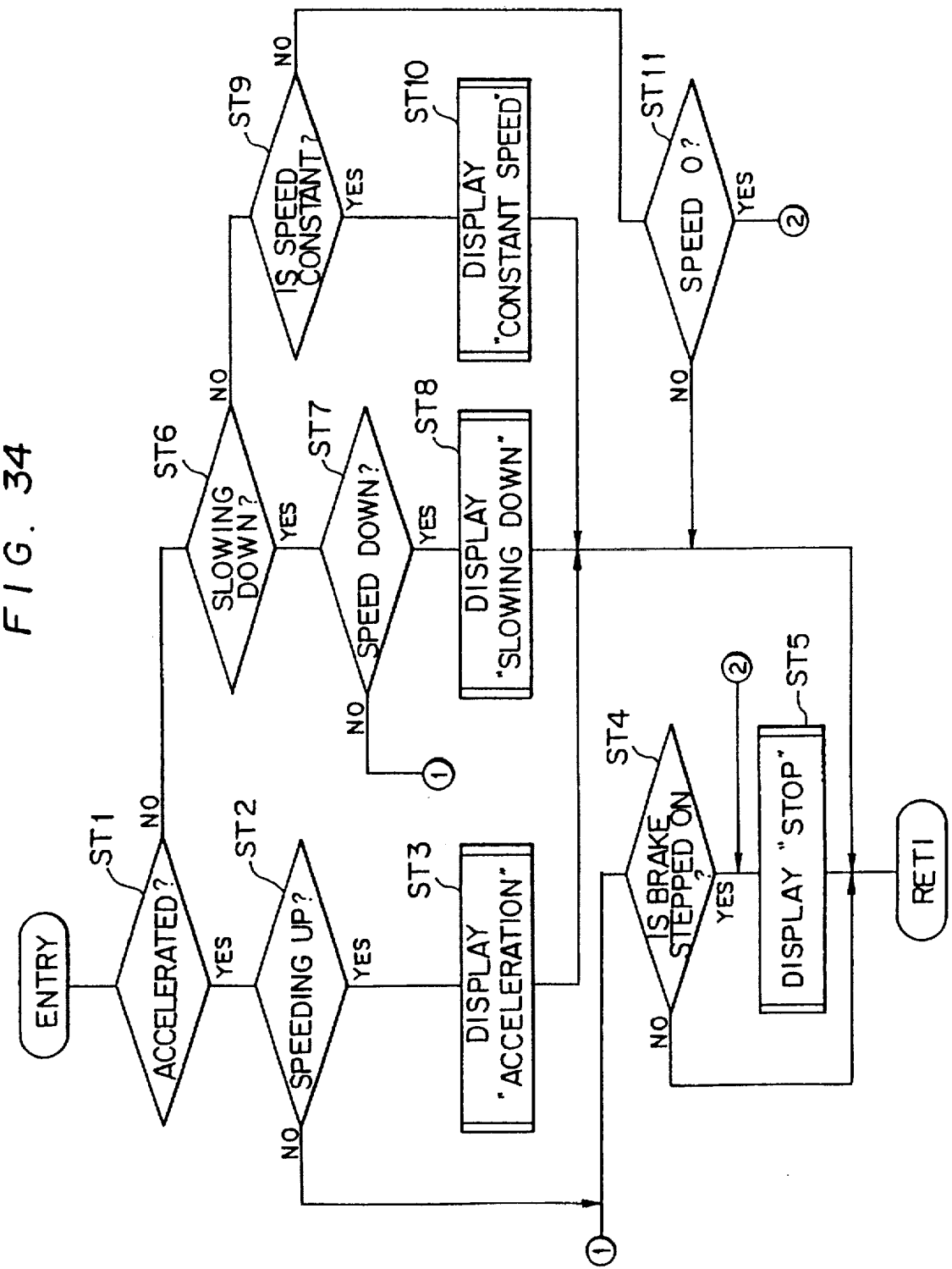
FIG. 34 shows a flowchart of a control progress relating to the vehicle operation status display apparatus.

FIG. 34 is a flowchart of a control program relating to the vehicle operation status display apparatus according to the present invention. The program is being written in a ROM.

The explanation will be made by referring to the flowchart.

The program of the flowchart is executed in a predetermined interval by a timer interruption process, for example.

In step 1 (ST1), it is judged based on the status of the input port I0 or input port I1, whether or not the automobile is now separated. If in a state of an acceleration of the automobile, process proceeds to step 2 (ST2) and a measurement result of A/D converting circuit 68 is read out and after a small interval of time provided, the measurement result of A/D converter circuit 68 is again read and it is judged based on the comparison between two measurement results whether the speed of the automobile is now increasing or not. As a result, when the speed is increasing, the process proceeds to step 3 (ST3), thereby controlling so that character "acceleration" is displayed on display 71a and 71b and thereafter the interruption process is ended.

Where the speed is not increasing, step 2 (ST2), the process proceeds to step 4 (ST4) and the status of the input port I2 is examined to judge whether or not the brake is now being driven. If the brake is operated, the process proceeds to step 5 (ST5) and a character "stop" is displayed on the display 71a and 71b and thereafter the interruption process if ended. Where the brake is not operated in step 4 (ST4), nothing is conducted and the interruption process if ended.

Where automobile is not in accelerating state in step 1 (ST1), the process proceeds to step 6 (ST6) and it is judged based on the status of the input 10 or input I1 whether or not the automobile is decelerated. If the automobile is in decelerating state, the step proceeds to step 7 (ST7). The process as in step 2 (ST2) is conducted and it is judged whether or not the it is decreasing. When the speed is decreasing, the process proceeds to step 8 (ST8) and a control is conducted so that a character "deceleration" is displayed on display 71a and 71b. Then the interruption process is completed. Where the speed is not decreasing in step 7 (ST7), the process proceeds to step 4 (ST4) and performs the above recited operation and the interruption process is ended. Where the automobile is not an decelerating state in step 6 (ST6), the process proceeds to step 9 (ST9) and the process as in ST2 and ST7 is performed predetermined whether the speed is almost constant or not. If the speed of the automobile is constant, the process proceeds to step 10 (ST10), and the character "constant speed" is displayed on the display 71a and 71b and thereafter the interruption process is completed. Where the speed is not constant in step 9 (ST9), the process proceeds to step 11 (ST11) and it is examined whether the speed is 0 or not. And if the speed is 0, the process proceeds to step 5 (ST5) and a character "stop" is displayed on the displays 71a and 71b and thereafter the interruption process is completed. Where it is judged in step 11 (ST11) that the speed is not 0, no operation is performed and the interruption process is completed. As an acceleration and deceleration detecting sensor, the pressure sensor such as a strain gage can be provided and the pressure sensor is provided at both ends of the case with cylindrical body or rectangular body made of a material such as plastic, glass and metal and further the liquid such as an oil is sealed in a pressured state and is enclosed in a case. Therefore the detection output based on the detection by the strain gage is input to input port of MPU61 and thus an accurate and precise control can be conducted to correspond to the variation of the state such as a slope of a road.

The vehicle operation status display apparatus displays the status of the current movement of the vehicle and the stopping status accurately and selectively in accordance with the current status of the vehicle and the operation state of the vehicle can be expressed to the following car and the following car can take and select judgment and the operation by observing the display of the proceeding car, thereby maintaining a smooth traffic communication order being contributed to a safe traffic.

FIGS. 33 to 43 disclose the vehicle movement direction display apparatus notifying the following car of the movement direction of the preceding car.

Figure 35:
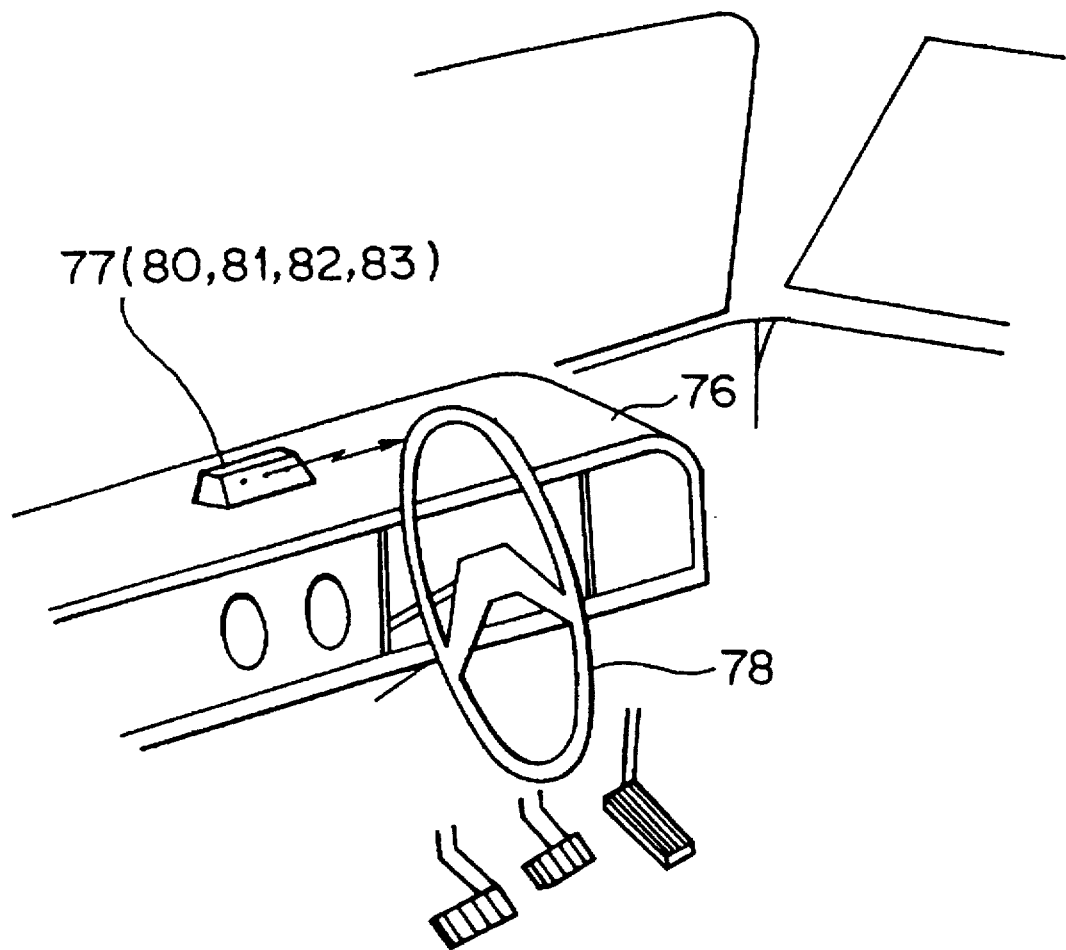
FIG. 35 is a schematic perspective view of the rotation degree detecting means of the handle in the vehicle moving directions display apparatus.

In FIG. 35, detection apparatus 77 is provided on the dash board 76. A light reflecting member 79 (FIG. 36) such as a mirror is provided on the rear side of handle 78 with regard to the driver. Light source 80 and two photo receiving element 81 and 82 display control circuit 83. FIG. 36 shows a rear side of the handle 78 and the reflector 79 is provided on the rear side of the handle 78. By having a position of the 12 o'clock of the handle, namely, P point of the handle 78 at the reference point, the width of the reflecting member 79 sequentially increasing when the reflecting member 79 is divided into a plurality of reflector units. A detection unit 77 is provided so that the light generated from light source 80 of detecting apparatus 77 radiated on reflector 80 within the predetermined scope having the P point as a central point when the handle 78 is in a normal position (in a state in which the car moves in a straight forwarding manner).

FIGS. 37(a), 37(b) and 37(c) show a relation of part of reflector 79 and light source 80 and light receiving element 81 and 82 in a convenient manner. The light receiving element 81 and 82 are positioned on both sides of light source 80 and as shown in FIG. 37(a), the reflection light provided on the left side of the point P is received by light receiving element 81 and the reflection light on the right side of the point P is received by light receiving element 82. In this case, the reflection light received by light receiving element 81 is provided from reflector member $79_{L1}$ and the reflection light received by light receiving element 82 is provided from reflecting member $79_{R1}$. The width of the reflector $79_{L1}$ is the same as that of reflector member $79_{R1}$. The width of the reflector body $79_{L4}$ is larger than that of the reflecting body $79_{L2}$ and the quantity of the light received by the receiving light emitting element 81 is larger than that of the light receiving element 22. Therefore, the output voltage of light receiving element 81 is larger than that of light emitting element 82. Namely, when the automobile goes forward straightly, the quantity of the received light of light element 88 and 82 is the same. Light receiving elements 81 and 82 output the voltage in proportion to the quantity of the received light. FIG. 37(b) designates the case where 78 is rotated and then the central portion of reflector member 79 is moved toward the reflecting light received by light receiving element 81 is mostly from reflector body $79_{L4}$ and most of reflection light received by light receiving element 82 is reflecting light from reflector body $79_{L2}$. The width of reflector body $79_{L4}$ is larger than width of reflector body $79_{L2}$ and thus, the quantity of the light received by light receiving element 81 is larger than that received by light receiving element 82. Therefore, the output voltage of light receiving element 81 is larger than that of light receiving element 82.

FIG. 37(c) shows the case where the handle 78 is rotated anti-clockwise and the portion of reflector member 79 is moved towards the left direction. The reflection light received by light receiving element 81 is forming reflector member 79 as to and the reflection light received by light receiving element 82 is from reflector member $79_{R4}$. The width of the reflector body $79_{R4}$ is larger than that of reflector body $79_{R2}$, the quantity of the light received by the light receiving element 82 is larger than the quantity of the light received by light receiving element 81. Therefore, output voltage of the light receiving element 81 is smaller than the output voltage of light receiving element 82.

Figure 38:
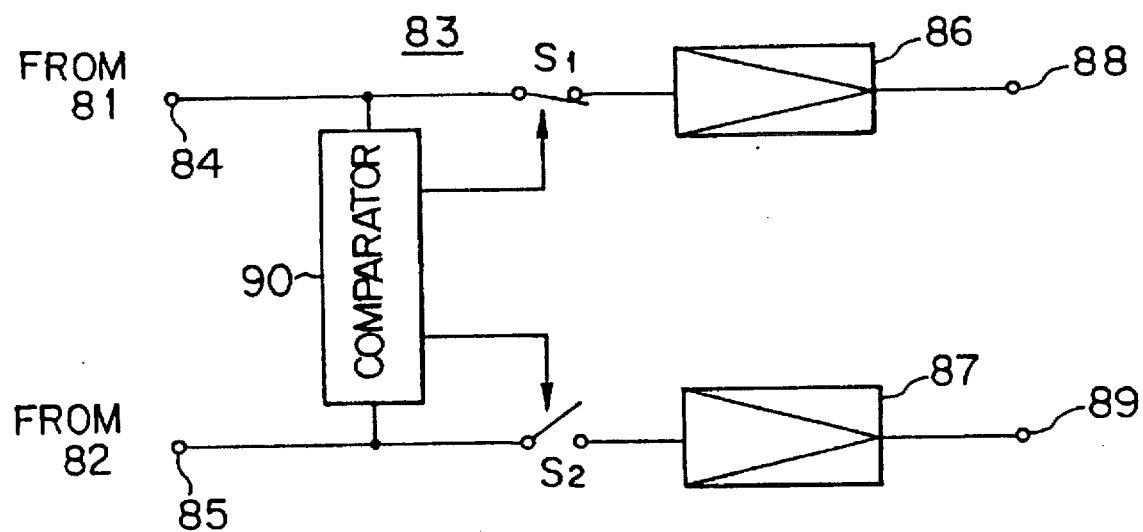
FIG. 38 shows a circuit diagram for designating the display control circuit in the vehicle moving direction display apparatus.

FIG. 38 shows a display control circuit 83 and 84 and 85 are respectively input terminals to which the output of light receiving element 81 and 82 are respectively input. S1 and S2 are switches and 86 and 87 are amplifiers, and 88 and 89 are output terminals. Output terminals 88 and 89 are respectively connected to a display apparatus not shown. The display apparatus connected to an output terminal 88 designates a clock wise rotation of handle 78 and the display apparatus connected to output terminal 89 represents an anti-clockwise rotation of handle 78. 90 is a comparator for comparing to input voltages and the comparator has two outputs for controlling a switching operation of switches S1 and S2. The output voltage of light receiving element 81 is input to the input terminal 84 and the output voltage of light receiving element 82 is input to input terminal 85. Input voltage is input to input terminal 84 and 85 are compared by comparator 90.

Figure 39:
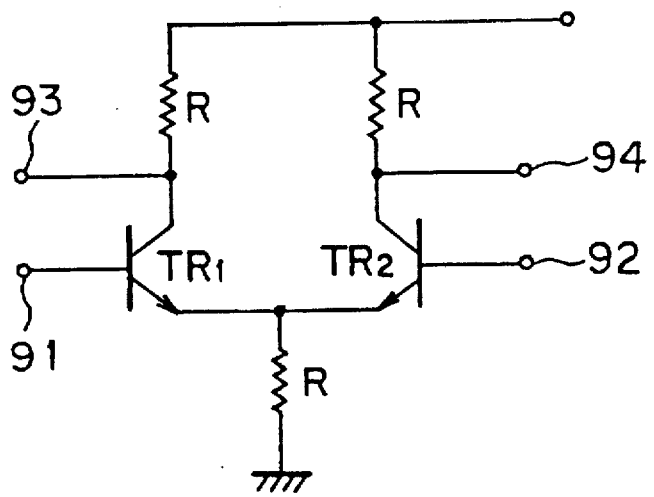
FIG. 39 shows a circuit diagram designating a concrete example of the comparator in the vehicle moving direction display apparatus.

FIG. 39 is an example of comparator 90 and comparator 90 comprises transistor Tr1 and Tr2 and three resistors. The base 91 of transistor Tr 1 is connected to input terminal 84 and is provided with the output voltage of light receiving element 81. Similarly, base 92 of transistor 92 of transistor Tr2 is connected to input terminal 85 and is provided with the output voltage of light receiving element 82. 93 and 94 represent output for controlling switch S1 and S2. When handle 78 is in a state shown in FIG. 37 (a), namely, the car goes straight forward the voltages from light receiving element 81 and 82 are the same and the voltages of the Tr1 and Tr2 are the same, namely, the transistor TR1 and TR2 will be turned on. At this time, outputs 93 and 94 open both switches S1 and S2. Accordingly, the outputs of the output terminal 88 and 89 of display control circuit 83 are 0 and the display is not formed on the display on the left side and right side. When handle 78 is rotated clockwise, and in the state shown in FIG. 37(*b*), the output voltage of light receiving element 81 is higher than that of light receiving element 82 and thus the basic voltage of transistor Tr1 becomes higher than that of transistor Tr2, thereby turning on transistor Tr1. Output 93 closes switch S1. As transistor Tr2 is turned off, switch 82 is opened. Accordingly, the output voltage of light receiving element 81 is provided to the display apparatus for the right direction through amplifier 86 and thereby designating that handle 78 is rotated clockwise. The display apparatus for the left direction does not display anything. When handle 78 is rotated anti-clockwise and is in a state shown in FIG. 37(*c*), which is opposite to the case shown in FIG. 37(*b*), the output voltage is provided from voltage of light receiving element 82 is provided from output terminal 89 and the display apparatus for the left direction designates that handle 78 is rotated anti-clockwise. The output voltage supply to the display apparatus for the right or left direction from output terminals 88 or 89 is in proportion to the amount of the receiving light by light receiving element 81 or 82, the light receiving quantity is determined by the width of the reflector for reflecting the light. Accordingly, when the degree of the rotation of handle 78 is large, the quantity of receiving light is large and thus the output voltage increases in proportion with the degree of the rotation of handle 78. The embodiment uses two light receiving elements but one of the light receiving elements may be omitted. A single light receiving element is used, for example, the output thereof is amplified then A/D converted by the A/D converter and then is processed by a micro processor so that the appropriate display is conducted.

Display apparatuses formed of 12 LEDs and when the output voltage from output terminal 88 and 89 become higher, LEDs are sequentially lit like a bar and the display and as shown in FIG. 29. In order to sequentially light LEDs in accordance with the output voltage, an appropriate driver IC provided between the respective output terminals and the display apparatus. Therefore, degree of the rotation of handle 78 is expressed by a bargraph and is notified to the following car.

Figure 40A:
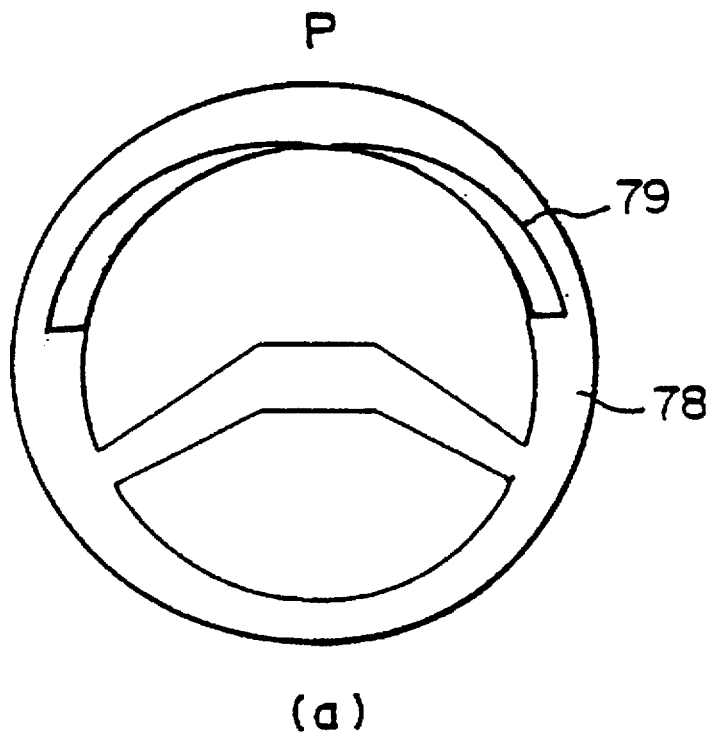
FIG. 40(a) and (b) are plan views for designating a modification of the reflector in the vehicle moving direction display apparatus.
Figure 40B:
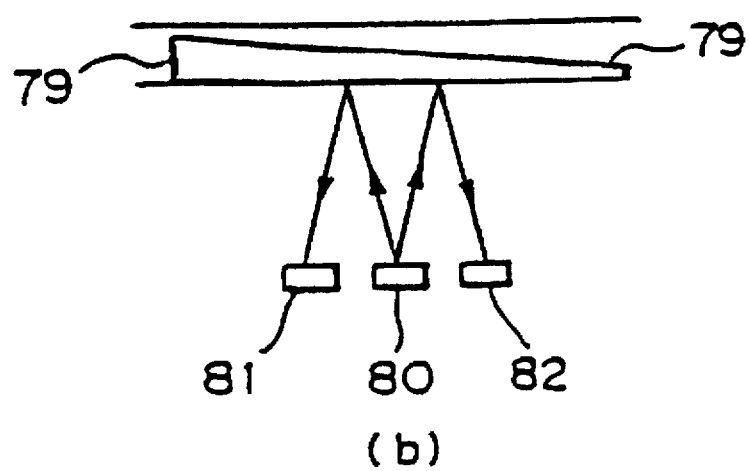

FIG. 40(*a*) is the another example of the reflecting body member. And the reflecting member is symmetric with regard to the reference point P and the height of the reflecting member increases in a peripheral portion. FIG. 40(*b*) shows the case that the handle 78 is rotated clockwise and thus the quantity of the receiving light by light receiver 81 is larger than that by light receiving element 82. The display control circuit shown in FIG. 38 is also used for this case.

Figure 41:
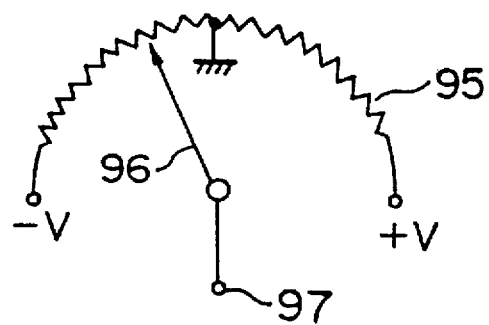
FIG. 41 is a plan view of a modification of the means for detecting the degree of the rotation of the handle in the vehicle moving direction display apparatus.

FIG. 41 displaces the light source and the light receiving elements in reflecting apparatus 77 by a variable resistor. The sliding element 96 is connected to an axis of handle and is slid in accordance with the rotation of the handle. A direct current voltage +V is applied to the terminal provided on the right side of variable resistor 95 and the direct current −V is added to the terminal of the left side. The center of the variable resisted 75 is grounded. The voltage corresponding to the degree of the rotation of the handle and output from the output terminal 97 of sliding member 96. When the car goes forward and straight, sliding member 96 is provided at the center and is grounded, thereby providing 0 output voltage. When the handle is rotated clockwise, the positive voltage is output to the output terminal 97 and the magnitude of the voltage is in proportion of the degree of the rotation of the handle. When the handle is rotated anti-clockwise, the negative voltage is outputted.

Figure 42:
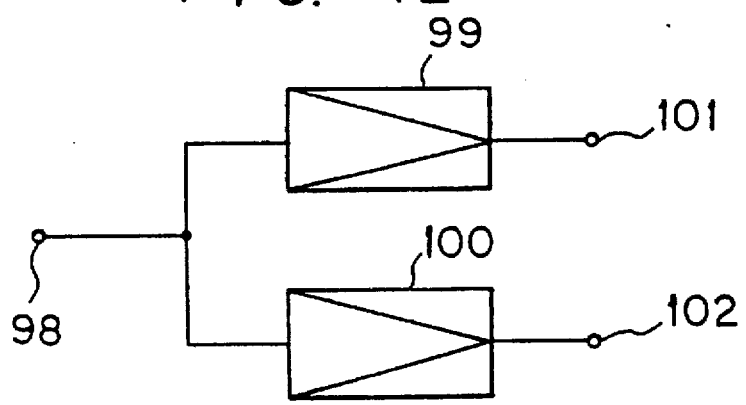
FIG. 42 shows a block diagram for designating a modification of the display control circuit in the vehicle moving direction display apparatus, and FIGS. 43(a), (b) show the characteristics of the amplifier shown in FIG. 42.
Figure 43A:
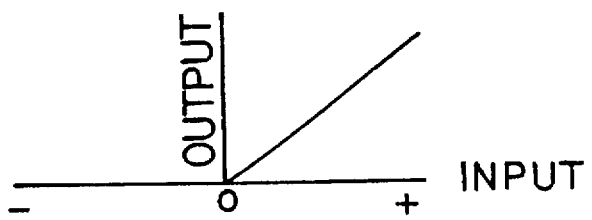
Figure 43B:
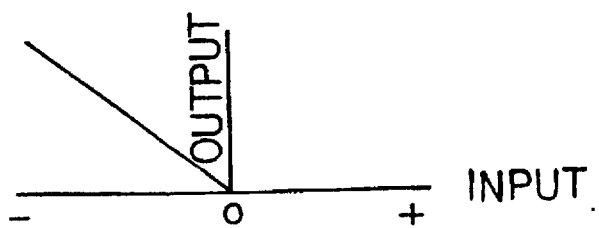

FIG. 42 shows a display control circuit and the input terminal 97 thereof is connected to the output terminal 97 of the sliding member. 99 is an amplifier for the input voltage of the positive polarity, 100 is an amplifier of an input voltage of the negative polarity, 101 and 102 are output terminal and are connected to the display on the right side and the display on the left side. FIG. 43(*a*) shows a characteristic of amplifier 99 and provides amplifying characteristic for the positive input voltage and FIG. 43(*b*) shows a characteristic of amplifier 100 and has an amplifying characteristic only for the negative input voltage. Therefore, when the handle is rotated clockwise, the positive input voltage input to input terminal 97 and the output voltage is provided to the display apparatus on the right side from the output terminal 101 through amplifier 99. The display apparatus on the right side represents the degree of the rotation of the handle and when receiving the output voltage from the output terminal 101. When the handle is rotated anti-clockwise, the negative voltage is applied to input terminal 98 and the output voltage is outputted from the output terminal 102 thereby displaying the degree of the rotation of the handle on the left display apparatus.

As is described above, the vehicle moving direction displaying apparatus detects the degree of the rotation of the handle directly from the handle and displays it. The vehicle moving direction display apparatus is not limited to the light or variable resistor as explained above, the detecting means, for example, a permanent magnet and magnetic resistor effect element may be used. The bar-graph of the display apparatus is explained by referring to LEDs but other light emitting body may be possible for by a character, symbol and figure. The electronic circuit for the display control element 83 comprises a micro processor unit and the control program.

The Possibility of the Utilizing the Invention in the Industrial View

As is described above, according to the present invention, it becomes possible to grasp or understand the driving status of the automobile and avoid the an accident of a rear-end collision, thereby maintaining a safety driving in a reliable manner and therefore the present invention is extremely useful for making a traffic condition of the society.

What is claimed is:

1. An accelerator operation magnitude display apparatus, comprising:
   a sensor that senses a magnitude of operation of an accelerator pedal, including a status in which said accelerator pedal is not operated, and at least one status in which the accelerator pedal is operated, without any mechanical movement of said sensor accompanying a mechanical movement of said accelerator pedal; and
   means for indicating said magnitude of operation of said accelerator pedal based upon an output from said sensor.

2. An accelerator operation magnitude display apparatus, comprising:
   a sensor that senses a magnitude of operation of an accelerator pedal, including a status in which said accelerator pedal is not operated, and at least one status in which the accelerator pedal is operated, without any mechanical movement of said sensor accompanying a mechanical movement of said accelerator pedal; and
   means for indicating said magnitude of operation of said accelerator pedal based upon an output from said sensor.

3. An operation status display apparatus, comprising:
   a sensor that senses a magnitude of operation of an accelerator pedal, including a status in which said accelerator pedal is not operated, and at least one status in which said accelerator pedal is operated, without any mechanical movement of said sensor accompanying a mechanical movement of said accelerator pedal;
   means for indicating said magnitude of operation of said accelerator pedal based upon an output from said sensor; and
   a parallel resonance circuit, wherein a signal corresponding to said magnitude of operation of said accelerator pedal is outputted by said sensor.

4. The vehicle operation status display apparatus of claim 3, wherein said parallel resonance circuit comprises a coil and a capacitor, said coil being magnetically coupled to said accelerator pedal is outputted by said sensor.

5. An accelerator operation status display apparatus comprising:
   a sensor that senses a magnitude of operation of an accelerator pedal, including a status in which said accelerator pedal is not operated, and at least one status in which said accelerator pedal is operated;
   means for indicating said magnitude of operation of said accelerator pedal based upon an output from said sensor;
   means for converting reciprocating movement of said accelerator pedal to rotational movement; and
   a rotary encoder for outputting a signal designating a rotational displacement of said means for converting.

6. The vehicle operation status display apparatus of claim 5, wherein said sensor comprises a rack and pinion arrangement.

7. An accelerator operation status display apparatus comprising:
   a sensor that senses a magnitude of operation of an accelerator pedal, including the status in which said accelerator pedal is not operated, and at least one status in which said accelerator pedal is operated;
   means for indicating said magnitude of operation of said accelerator pedal based on an output from said sensor;
   an oscillation body for producing ultrasonic waves, said oscillation body oriented to direct the ultrasonic waves towards said accelerator pedal for reflection therefrom; and
   an oscillation sensing body for receiving ultrasonic waves reflected from said accelerator pedal.

8. An accelerator operation status display apparatus comprising:
   a sensor that senses a magnitude of operation of an accelerator pedal, including a status in which said accelerator pedal is not operated, and at least one status in which the accelerator pedal is operated;
   means for indicating said magnitude of operation of said accelerator pedal based upon an output from said sensor;
   an elastic member connected between said accelerator pedal and a structure which is fixed with respect to movement of said accelerator pedal; and
   a strain sensor which detects a strain condition of said elastic member and outputs a signal which is indicative of said strain condition as well as indicative of the position of said accelerator pedal.

9. An accelerator operation status display apparatus comprising:
   a sensor that senses a magnitude of operation of an accelerator pedal, including the status in which said accelerator pedal is not operated, and at least one status in which the accelerator pedal is operated;
   means for indicating said magnitude of operation of said accelerator pedal based upon an output from said sensor;
   a plate pivotally supported by a support member and having pivotal ends on opposite sides of said support member, said support member being attached to a structure which is fixed with respect to movement of said accelerator pedal;
   a wire connected to one of said pivotal ends of said plate;
   a spring connected to an end of said wire which is opposite in end of said wire which is connected to said one pivotal end of said plate; and
   a variable resistor connected with said spring near said connection of said spring with said end of said wire;
   wherein said accelerator pedal engages the other of said pivotal ends opposite said one of said pivotal ends so that depression of said accelerator pedal pivots said plate, which in turn extends said spring and varies a resistance value of said variable resistor.

* * * * *